United States Patent
Lacko et al.

(10) Patent No.: US 10,152,195 B2
(45) Date of Patent: Dec. 11, 2018

(54) AIRCRAFT DISPLAY SYSTEM PERTAINING TO ENERGY MANAGEMENT

(71) Applicant: HONEYWELL INTERNATIONAL INC., Morris Plains, NJ (US)

(72) Inventors: Ivan Lacko, Slovak Republic (CZ); Yujia Cao, Moravia (CZ); Zdenek Moravek, Rozdrojovice (CZ); Stepan Dopita, Jihomoravsky kraj (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 105 days.

(21) Appl. No.: 14/967,557

(22) Filed: Dec. 14, 2015

(65) Prior Publication Data

US 2017/0168658 A1    Jun. 15, 2017

(51) Int. Cl.
| | | |
|---|---|---|
| *G06F 3/048* | (2013.01) | |
| *G06F 3/0481* | (2013.01) | |
| *G01C 23/00* | (2006.01) | |
| *G08G 5/00* | (2006.01) | |
| *G08G 5/02* | (2006.01) | |

(52) U.S. Cl.
CPC ......... *G06F 3/0481* (2013.01); *G01C 23/005* (2013.01); *G08G 5/0021* (2013.01); *G08G 5/025* (2013.01)

(58) Field of Classification Search
CPC .... G06F 3/0481; G08G 5/0021; G08G 5/025; G01C 23/005
See application file for complete search history.

(56) References Cited

U.S. PATENT DOCUMENTS

| | | |
|---|---|---|
| 3,559,481 A | 2/1971 | Vietor |
| 4,319,219 A | 3/1982 | Rein-Weston |
| 6,112,141 A | 8/2000 | Briffe |
| 6,389,355 B1 | 5/2002 | Gibbs et al. |
| 6,584,382 B2 * | 6/2003 | Karem ................. G05D 1/0038 701/3 |
| 6,629,023 B1 | 9/2003 | Slider, Jr. et al. |
| 7,068,187 B2 | 6/2006 | Ishihara et al. |
| 7,132,960 B2 | 11/2006 | Glover |
| 7,212,135 B1 | 5/2007 | Lynch et al. |
| 7,308,343 B1 | 12/2007 | Horvath et al. |
| 7,436,323 B2 | 10/2008 | Ishihara et al. |
| 7,471,997 B2 | 12/2008 | Tezuka |

(Continued)

OTHER PUBLICATIONS

Extended EP Search Report for Application No. 16199228.4-1803 dated Apr. 26, 2017.

(Continued)

*Primary Examiner* — Nicholas Klicos
(74) *Attorney, Agent, or Firm* — Lorenz & Kopf, LLP

(57) ABSTRACT

A computer-implemented flight display system including a computer processor that is capable of determining a current energy situation of an aircraft, an electronic display device, and a graphical user interface (GUI) provided on the electronic display device. The GUI includes a current aircraft position symbol, an optimal aircraft position symbol, and at least one symbol indicating a position for changing aircraft configuration. Relative positioning on the GUI of the optimal aircraft position system and the at least one symbol indicating a position for changing aircraft configuration is based at least in part on the determined current energy situation of the aircraft.

10 Claims, 21 Drawing Sheets

(56) References Cited

U.S. PATENT DOCUMENTS

| | | | |
|---|---|---|---|
| 7,647,140 B2 | 1/2010 | Demortier et al. | |
| 7,818,100 B2 | 10/2010 | Goodman et al. | |
| 7,957,878 B2 | 6/2011 | Rado | |
| 8,014,912 B2 | 9/2011 | Zadrozynski et al. | |
| 8,024,078 B2 | 9/2011 | Coulmeau | |
| 8,126,599 B2 | 2/2012 | Coulmeau | |
| 8,126,600 B2 | 2/2012 | Conner | |
| 8,170,727 B2 | 5/2012 | Deker | |
| 8,346,412 B2 | 1/2013 | Lacaze et al. | |
| 8,412,392 B2 | 4/2013 | Jayathirtha et al. | |
| 8,436,750 B2 | 5/2013 | Fabre | |
| 8,532,844 B2 | 9/2013 | Wilson et al. | |
| 8,682,580 B2 | 3/2014 | Clark et al. | |
| 8,774,989 B1 | 7/2014 | Bush et al. | |
| 8,781,654 B2 | 7/2014 | Giovannini et al. | |
| 9,934,692 B2 | 4/2018 | Lacko et al. | |
| 2002/0039070 A1* | 4/2002 | Ververs | G01C 23/00 340/901 |
| 2004/0044446 A1 | 3/2004 | Staggs | |
| 2005/0261813 A1 | 11/2005 | Ryan et al. | |
| 2006/0025901 A1 | 2/2006 | Demortier et al. | |
| 2006/0200279 A1 | 9/2006 | Ainsworth et al. | |
| 2006/0265110 A1 | 11/2006 | Ferro et al. | |
| 2007/0142982 A1 | 6/2007 | Lorido | |
| 2008/0140272 A1 | 6/2008 | Zadrozynski et al. | |
| 2008/0162092 A1 | 7/2008 | Coulmeau et al. | |
| 2008/0195301 A1 | 8/2008 | Fabre | |
| 2008/0249675 A1 | 10/2008 | Goodman | |
| 2008/0262665 A1 | 10/2008 | Coulmeau | |
| 2009/0018713 A1 | 1/2009 | Coulmeau et al. | |
| 2009/0043434 A1 | 2/2009 | Deker | |
| 2009/0048724 A1 | 2/2009 | Caule | |
| 2009/0319105 A1 | 12/2009 | Conner | |
| 2010/0036551 A1 | 2/2010 | Lacaze et al. | |
| 2010/0191394 A1 | 7/2010 | Villaume | |
| 2010/0286852 A1 | 11/2010 | Bouquet | |
| 2010/0318244 A1 | 12/2010 | Gomez et al. | |
| 2011/0082605 A1 | 4/2011 | Coulmeau et al. | |
| 2011/0166723 A1 | 7/2011 | Valentova et al. | |
| 2011/0202208 A1 | 8/2011 | Karnik et al. | |
| 2011/0264312 A1 | 10/2011 | Spinelli et al. | |
| 2012/0053760 A1 | 3/2012 | Burnside et al. | |
| 2013/0204470 A1 | 8/2013 | Luckner et al. | |
| 2013/0218374 A1 | 8/2013 | Lacko et al. | |
| 2014/0343765 A1* | 11/2014 | Suiter | G08G 5/0056 701/18 |
| 2014/0343766 A1 | 11/2014 | Le Gall et al. | |
| 2015/0127196 A1 | 5/2015 | Ishihara et al. | |
| 2016/0004374 A1* | 1/2016 | Kneuper | G06F 3/0416 345/173 |
| 2016/0085239 A1 | 3/2016 | Boyer et al. | |
| 2016/0107766 A1 | 4/2016 | He et al. | |
| 2016/0229554 A1 | 8/2016 | Kawalkar et al. | |
| 2017/0088284 A1 | 3/2017 | Holder | |
| 2017/0168658 A1 | 6/2017 | Lacko et al. | |
| 2017/0243495 A1 | 8/2017 | Moravek et al. | |
| 2017/0358226 A1 | 12/2017 | Hodges et al. | |

OTHER PUBLICATIONS

Becher, T.A., et al.; Methods for Maintaining Benefits for Merging Aircraft on Terminal RNAV Routes; 2004 IEEE.

Zadeh, V.T.; Fuzzy Logic Approach to Airplane Precision Instrument Approach and Landing; vol. 7, No. 4, Apr. 2012 ISSN 1819-6608 ARPN Journal of Engineering and Applied Sciences © 2006-2012 Asian Research Publishing Network (ARPN).

Ohme, P. A Model-Based Approach to Aircraft Takeo and Landing Performance Assessment; AIAA Atmospheric Flight Mechanics Conference Aug. 10-13, 2009, Chicago, Illinois.

Huisman, H. et al.; Crew Interfaces for Future ATM; Man Machine Integration Department National Aerospace Laboratory (NLR) Amsterdam The Netherlands;1997 IEEE.

EP Search Report for Application No. 13154950.3-1810/2654029 dated Jun. 10, 2016.

USPTO Office Action for U.S. Appl. No. 13/590,503; dated Jan. 14, 2014.

USPTO Final Office Action for U.S. Appl. No. 13/590,503; dated May 29, 2014.

USPTO Panel Decision for U.S. Appl. No. 13/590,503; Notification date Oct. 24, 2014.

USPTO Examiner's Answer for U.S. Appl. No. 13/590,503; dated Feb. 25, 2015.

USPTO Patent Trial and Appeal Board Docketing Notice for U.S. Appl. No. 13/590,503; Notification date May 8, 2015.

USPTO Office Action for U.S. Appl. No. 13/590,503 dated May 29, 2014.

EP Exam Report for Application No. 13154950.3 dated Jun. 22, 2016.

Notice of Allowance from U.S. Appl. No. 13/590,503 dated Nov. 22, 2017.

Shish, K., et al.; Trajectory Prediction and Alerting for Aircraft Mode and Energy State Awareness.

Adami, T., et al.; An Energy Management Display for General Aviation Safety Enhancements; Ohio University Avionics Engineering Center, 33rd Digital Avionics Systems Conference, Colorado Springs, CO.

Croft, J.; Next-Generation EFBs Integral to NextGen Cockpit; Aviation Week & Space Technology; Retrieved from Internet [[http://aviationweek.com/aftermarket-solutions/next-generation-efbs-integral-nextgen-cockpit Jun. 5, 2018]].

USPTO Notice of References for U.S. Appl. No. 13/590,503 initialed by Examiner on Dec. 6, 2017.

EP Exam Report for Application 13154950.3 dated Jul. 19, 2018.

* cited by examiner

AIRCRAFT DISPLAY SYSTEM PERTAINING TO ENERGY MANAGEMENT

TECHNICAL FIELD

The present disclosure relates generally to an electronic display, wherein the electronic display is suitable for implementation on an aircraft. More particularly, embodiments of the present disclosure relate to a flight display system, pertaining to energy management, wherein the embodiments are provided to assist the flight crew in performing the approach procedures, such as approach to landing at an airport.

BACKGROUND

Energy management of the aircraft during the approach is a topic of great concern in the aviation industry. As used herein, the term "energy management" relates, at least in part, to the kinetic energy of the aircraft (forward motion through space) and the potential energy of the aircraft (in reference to its height above the ground). Proper execution of energy management can significantly reduce landing related accidents and incidents and thus improve overall safety statistics for the aviation industry.

The person skilled in this art is currently aware of several systems in the prior art that can support a pilot with energy management. However this is a complex task affected by multiple parameters, e.g. speed, altitude, configuration, distance from the threshold, lateral and vertical route constraints, etc. Various algorithms and commercial implementations have been published in the art, which can provide various styles of "outputs" for energy management support. One example is the commonly-assigned U.S. patent application publication no. 2013/0218374 A1, the contents of which are incorporated by reference herein in their entirety. In addition, it is important to properly communicate the output of such algorithm to end user, i.e., the flight crew/pilot.

In the current art, a particular challenge is to depict (graphically) complex output data in a simple and compact way so that the pilot can quickly evaluate aircraft energy with respect to current situation in flight (remaining distance to go, altitude, current aircraft configuration, ATC constraints, etc.) as well as understand its future evolution. Moreover, energy depiction should allow pilots to easily understand the options of action, and do so even while performing other demanding tasks during descend and approach. Accordingly, it should be understood that the closest prior art to this patent application are those systems that communicate energy management to the flight crew, but do so in a way that is sub-optimal. The goal of the present patent application is to overcome the technical challenges of presenting this information to the flight crew in a manner that is easy to interpret and understand such that the pilot can quickly evaluate aircraft energy with respect to current situation in flight as well as understand its future evolution. Our technical solution to this problem considers the following parameters, with reference to the pilot's understanding of the aircraft's current energy situation:

a) current energy situation of the aircraft by means of selected parameter (speed or distance to go);
b) what should be the optimum energy situation at this moment;
c) how far the aircraft is from a critical situation—in this case from unstabilized approach;
d) whether there are actions compliant with SOPs that would assure a stabilized approach at the final gate:
 1) if so, what actions are applicable at the moment;
 2) if not, what is the additional distance to go which would be sufficient to re-stabilize the approach;
e) if the approach is unstabilized when getting closer to the ground, what are the reasons for being unstabilized;

As such, while the closest prior art discloses algorithms that generate energy management information, so far, the display of such information to the flight crew in an effective and easy to understand manner has proven elusive. Thus, it is an object of the present disclosure to provide flight displays and methods for generating flight displays pertaining to energy management that constitute an improvement over the prior art in their presentation of such information to the flight crew. Our disclosure thus focuses on systems for displaying energy management information that have never before been seen or suggested in the prior art. Other desirable features and characteristics of the present invention will become apparent from the subsequent detailed description of the invention and the appended claims, taken in conjunction with the accompanying drawings and this background of the invention.

BRIEF SUMMARY

As used herein, the term "display" refers broadly to any means or method for the distribution of information to a flight crew or other aircraft operator, whether visually, aurally, tactilely, or otherwise. Also, the term "final gate" means the final position where aircraft should be stabilized to continue the approach. In current aviation regulation, a stabilization gate of 1000 feet (ft.) is always preferred. Only when there is visual contact with the runway (VMC flight condition), 500 ft. can be considered as a final gate if the 1000 ft. gate is missed.

As a brief summary, this disclosure may be understood as disclosing graphical symbology, integrated into existing flight display systems or as a standalone flight display system, that convey the following information in a manner that is easy to understand from the perspective of a flight crew on approach to an airport:

a) energy projected on speed:
 1) maximum speed which the aircraft can have at this moment from which it is possible to become stabilized at final gate (1000 ft. or 500 ft.);
 2) optimum speed of the aircraft for the current situation;
 3) speed interval (minimum to maximum) for each configuration change, within which the application of given configuration would assure stabilized approach;
b) energy projected on distance to go:
 1) position of the last point after which it is impossible to become stabilized at the final gate (with the current configuration);
 2) position of next configuration change to ensure continuous deceleration and stabilized state at final gate;
 3) the optimum position where aircraft should be with the current speed;
 4) distance interval (minimum to maximum) for each configuration change, within which the application of given configuration would assure stabilized approach;

c) for current DTG (Distance To Go) and speed:
   1) whether it is possible to be stabilized at 1000 ft. or 500 ft.;
   2) what level of drag is desired to become stabilized at final gate;
d) whether to use speed brakes;
e) whether to use early extension of landing gear;
f) added below 1200 ft.:
   1) status of compliance with all stabilized approach criteria;
   2) in case of deviations from these criteria—causes of deviations;
g) additional factors influencing energy states, e.g. excessive tailwind, excessive vertical speed, etc.

In accordance with the improvements over the prior art disclosed herein, the above-mentioned algorithm outputs (a through g) are further selected to be depicted on the Graphical User Interface (GUI) of the aircraft display systems, e.g. cockpit display systems. The selection is largely affected on the target GUI implementation platform, such may be decided based upon the following:

a) new graphical elements implemented into existing GUI blocks like speed-tape or vertical situation display;
b) new standalone GUI block depicted on PFD (primary flight display), ND (navigation display), or MFD (multi-function display);
c) new standalone GUI running on EFB (electronic flight bag);

According to the foregoing, it should be appreciated that the present disclosure provides, in some embodiments, a computer-implemented flight display system including a computer processor that is capable of determining a current energy situation of an aircraft, an electronic display device, and a graphical user interface (GUI) provided on the electronic display device. The GUI includes a current aircraft position symbol, an optimal aircraft position symbol, and at least one symbol indicating a position for changing aircraft configuration. Relative positioning on the GUI of the optimal aircraft position system and the at least one symbol indicating a position for changing aircraft configuration is based at least in part on the determined current energy situation of the aircraft.

In other embodiments, disclosed is a computer-implemented flight display system including a computer processor that is capable of determining a current energy situation of an aircraft, an electronic display device, and a graphical user interface (GUI) provided on the electronic display device. The GUI includes a current aircraft speed symbol, an optimal aircraft speed symbol, and at least one symbol indicating an aircraft configuration change for achieving the optimal aircraft speed. Relative positioning on the GUI of the optimal aircraft position system and the at least one symbol indicating an aircraft configuration change for achieving the optimal aircraft speed is based at least in part on the determined current energy situation of the aircraft.

In yet another embodiment, disclosed is a computer-implemented flight display system including a computer processor that is capable of determining a current energy situation of an aircraft, an electronic display device, and a graphical user interface (GUI) provided on the electronic display device. The GUI includes a current aircraft speed symbol, an optimal aircraft speed symbol, and at least one symbol indicating a required aircraft drag in order for the aircraft to achieve the optimal aircraft speed. Relative positioning on the GUI of the optimal aircraft position system and the at least one symbol indicating the required aircraft drag in order for the aircraft to achieve the optimal aircraft speed is based at least in part on the determined current energy situation of the aircraft.

In still a further exemplary embodiment, a computer-implemented flight display system includes a computer processor that is capable of determining a current energy situation of an aircraft, an electronic display device, and a graphical user interface (GUI) provided on the electronic display device. The GUI includes a flight-path marker symbol or a flaps indicator symbol and at least one symbol indicating a required aircraft drag in order for the aircraft to achieve the optimal aircraft speed. The symbols indicating required drag are attached to flight-path marker or flaps indicator and the symbol indicating the required aircraft drag in order for the aircraft to achieve the optimal aircraft speed is based at least in part on the determined current energy situation of the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

At least one example of the present invention will hereinafter be described in conjunction with the following figures, wherein like numerals denote like elements, and wherein.

DETAILED DESCRIPTION

Figure 1:
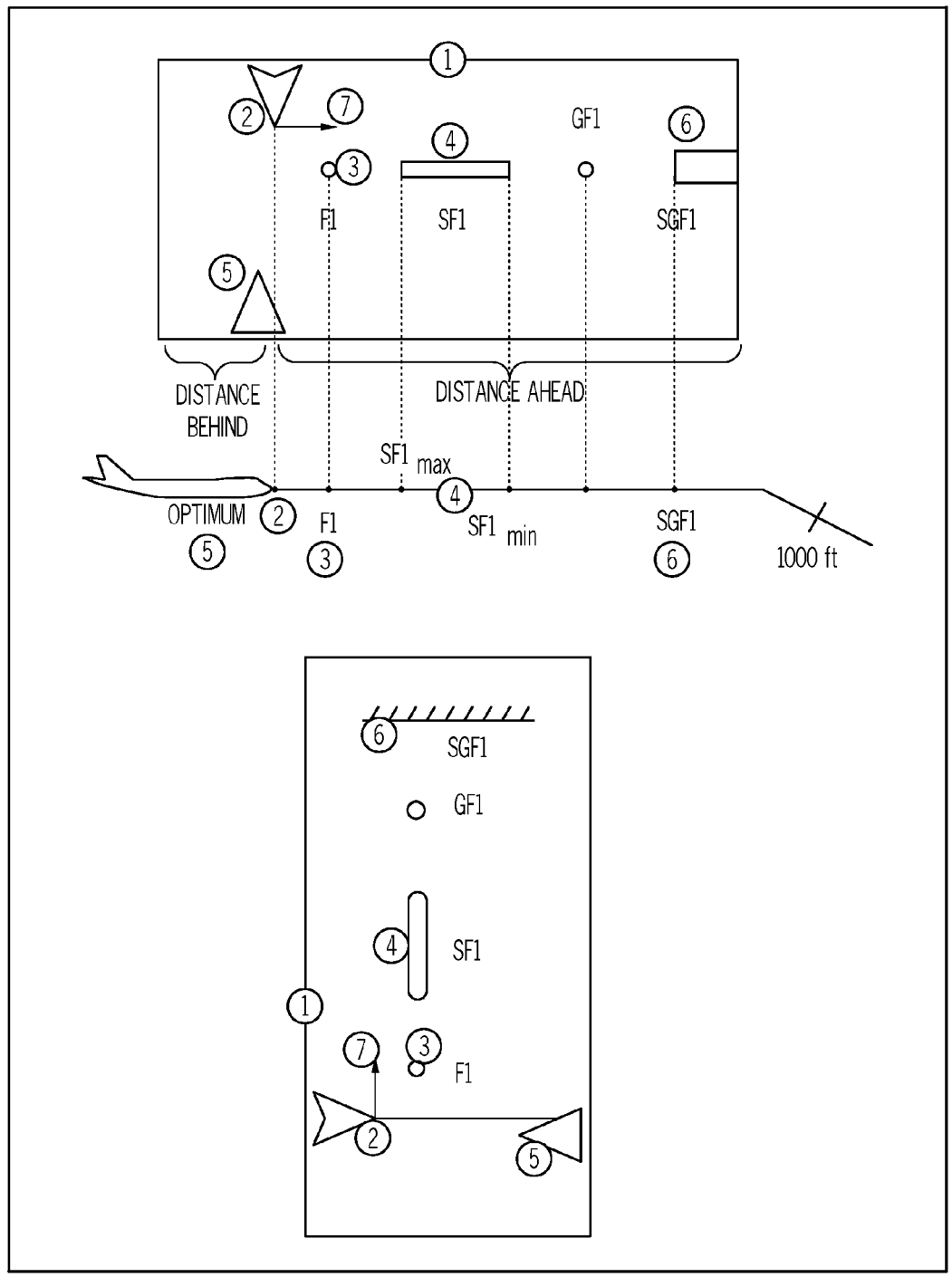
FIGS. 1-21G illustrate various embodiments of flight displays including a graphical user interface, suitable for presentation in a cockpit environment of an aircraft, either as a standalone concept or an embedded concept, in accordance with certain embodiments of the present disclosure.

The following detailed description is merely exemplary in nature and is not intended to limit the invention or the application and uses of the invention. Furthermore, there is no intention to be bound by any theory presented in the preceding background or the following detailed description.

The present disclosure is directed to a display system and a method for generating a display to assist the flight crew of an aircraft in performing an approach to an airport in the most efficient manner possible. Embodiments of the present disclosure are based on an approach algorithm that takes into account the type of aircraft, the weight of the aircraft, current weather conditions (at the aircraft and at the airport), the position of the aircraft with regard to the airport, standard approach procedures, and current airspeed. As discussed above, it is often the case that the flight crew is not able to estimate precisely what distance the aircraft needs to decelerate from one speed to another while descending with a particular descent rate for a particular wind component in the current atmosphere, with or without speed-brakes, landing gear, future flaps, etc. However, the approach algorithm, as will be described in greater detail below, is configured to make such calculations many times per second, from the current position of the aircraft until touchdown. Based on the calculations performed by the approach algorithm, a display is provided to the flight crew, indicating the optimal times to perform various approach procedures, including but not limited to lowering flaps, applying speed brakes, extending the landing gear, etc. And further, based on the foregoing calculations, the present disclosure provides various graphical displays, in either a standalone or embedded format, to assist the flight crew in more easily understanding the energy management information so calculated.

The disclosed approach algorithm is configured to operate where the aircraft is several thousand feet above (destination) aerodrome level (AAL), for example at least about 5000 ft. AAL, such as at least about 10000 ft. AAL, or more preferably at least about 15,000 ft. AAL. The approach algorithm provides flight crew instructions via the display down to 500 ft. AAL. This number is not fixed, can be changed anytime. Also for circling approach it is 300 ft. As such, the flight crew is supported in flying the aircraft down to 500 ft. in such a way that the stabilized approach criteria are met at the stabilization height so that the last 500 ft. down to the ground can be flown in a stabilized configuration.

In one aspect, embodiments of the present disclosure, using the aforementioned approach algorithm, calculate optimum deceleration profile on given vertical or lateral path. When aircraft reaches position predetermined by the calculation, the display system can provide a display to the flight crew to advise the crew regarding a configuration change (for example, extending flaps, speed brakes, and/or landing gear, etc.), thereby allowing the crew to fly the most energy efficient (e.g., with the lowest possible costs) and quiet approach while still assuring that the approach is stabilized and safe.

In a further aspect, embodiments of the present disclosure, using the aforementioned approach algorithm, monitor aircraft parameters as discussed above and in case the standard approach is no longer possible (for example due to the crew ignoring or missing previous advisements from the display system), offer non-standard corrective actions to allow the aircraft to reach a stabilized approach prior to the landing decision altitude (for example, 1000 feet AAL). For example, such non-standard corrective actions include, but are not limited to, the use of speed-brakes, an early landing gear extension, and/or level flight deceleration. These non-standard corrective actions will reduce the current unwanted practice where the crew inadvertently continues to a stabilized approach minimum altitude in an unstable configuration and is thereafter forced to commence a "go around" procedure. It is therefore expected that timely advisements for non-standard corrective actions will increase both flight safety (stabilization of aircraft) and economy (reduced number of go-arounds).

In a further aspect, embodiments of the present disclosure, using the aforementioned algorithm, are configured to evaluate whether the aircraft is able to meet the stabilized approach criteria even with the use of non-standard corrective actions. In the event that even these actions are calculated to be insufficient to bring the aircraft to a stabilized approach prior to reaching the minimum decent altitude, the display system is configured to advise the crew that a stabilized approach is not feasible and to commence a go around procedure. As such, this feature will allow the crew to commence a go-around from a higher altitude, further away from ground obstacles, and with less fuel burning during the climb to the go-around altitude. This can significantly decrease the number of un-stabilized approaches and subsequently the number of approach and landing accidents. Instructions for a go-around, when inevitable, increase both flight safety (lower risk of continuation in an un-stabilized approach) and economy (shorter climbing part of the go around procedure and shorter distance flown during vectoring for the new approach).

Thus, the algorithm calculates optimum deceleration profile from present position to the touchdown point while taking into account required configuration changes. It evaluates whether stabilization criteria are met by certain point. It evaluates numerous scenarios of configuration changes in order to achieve stabilization and picks the best one based on factors such as fuel efficiency or time, while keeping the safety as the top priority. In case that stabilization cannot be achieved by certain point by any scenario, the crew is informed about this and go around as a safety measure is suggested.

It will be appreciated by those having ordinary skill in the art that every aircraft type is different, and as such no single formula is possible for making the calculations described herein. However, it is expected that a person having ordinary skill in the art will be able to consult any given aircraft reference manual for information regarding aircraft performance with flap extensions, speed brake extensions, landing gear extension, fuel consumption and weight, and other parameters as necessary to configure a system in accordance with the teachings of the present disclosure to perform the calculations described above. It will be appreciated that a person having ordinary skill in the art will be able to adapt these teaching to various aircraft by consulting the appropriate reference manual therefor.

Algorithm Description

The algorithm includes instructions for a list of scenarios which is tailored for particular aircraft type. This list can be adjustable by user of this application (e.g. aircraft operator). Every scenario definition contains: a sequence of configuration changes; a description at what speed next configuration change can be suggested; and a desired vertical profile. Other factors can be included as well.

The sequence of configuration changes refers to what flaps are gradually extended during approach (some aircraft have intermediate flap positions which can be skipped). Every scenario also describes when the landing gear is extended (in some scenarios early gear extension helps increase deceleration and descend rates). Some scenarios contain also a description of usage of other devices which can increase drag such as speedbrakes.

In some embodiments, the whole process of configuration changes for landing from clean configuration until final configuration is preferably flown as continual deceleration in order to keep fuel consumption at minimum. For this reason there are predefined speeds, at which next flaps are suggested and deceleration can continue. Another reason for these speed definitions is a situation when there is a need for higher deceleration rate, extension of flaps or landing gear at higher speeds will reduce distance required to decelerate. The user of algorithm (e.g. aircraft operator) can express his preference in usage of this method by modifying scenario list. Of course, maximum allowed speeds for every configuration are always considered and the algorithm takes it into account and never suggests any violation of aircraft limitations.

The algorithm provides, calculates, or otherwise employs a desired vertical profile for the descent. There is usually more than one way to descend. One standard option is to fly level until reaching glidepath and then following this glidepath for landing. But if an aircraft gets into situation where following glidepath would lead to unstabilized approach (due to high speed or insufficient configuration at that moment), a new scenario can be used which uses other than standard vertical profile is required. One example can be deploying aircraft configuration in level deceleration above glidepath and when extended flaps and landing gear can generate sufficient drag aircraft initiates descend and capturing the glidepath from above.

Some scenarios can be to suggest descending before reaching final approach glidepath. For example a scenario which (in order to reduce time to landing) suggests early high speed descend to the cleared altitude (e.g., detected from preselected altitude on Master Control Panel/Guidance Panel/Flight Control Unit, from received datalink ATC instruction, from FMS, etc.) and then longer level deceleration segment before the final approach. Such early descend scenario would require additional terrain database in order to maintain highest possible level of safety. The whole proposed lateral and vertical profile would then be crosschecked with the terrain database for sufficient clearance from the terrain.

For aircraft above glideslope let it glide and capture aircraft from above without level deceleration segment; for aircraft above glideslope uses level deceleration but only in such a way to stay within indication area of ILS.

The algorithm determines the available distance to go until the runway. This information can be read from aircraft flight management system or it can be calculated independently by the algorithm. A combination of these two can provide even better results.

The algorithm can check whether the track prescribed in the FMS (e.g., checking heading and cross-track error) is followed by the aircraft or not (e.g. not followed due to the crew switching to manual flight for visual approach). In case that FMS routing is not followed, the algorithm can also check modes of autopilot being used and compare current flight path of the aircraft with waypoints ahead and evaluate reasons for not following the FMS (e.g. due to visual approach or ATC radar vectoring). This feature can have abilities to learn based on previous visits of the airport, it can be adjustable by aircraft operator, it also can have option for the crew to select what is their intention (e.g., visual approach will be flown). Based on expected intentions the algorithm can propose lateral and vertical path and thus crew and application can have realistic distance to go information. Examples of the new flight path suggested can be visual approach which reaches final approach course at predefined distance before the runway threshold at appropriate altitude, or a circling approach with (predefined or automatically calculated) lateral and vertical profile for the selected runway.

Furthermore, the algorithm is provided predefined list of scenarios (it can be tailored for particular aircraft type and for operators SOPs and other needs) and every scenario is individually evaluated. Evaluation means determination whether the scenario is usable for current situation or not and then supplementing the scenario with other calculated parameters as described below. The first step in evaluation is filtering out all the scenarios which are not reflecting current situation in number of operating engines. Since there could be scenarios for engine or engines out situations or jammed flaps, the algorithm will use those only when needed. There could be also scenarios for situations with all engines out to assist pilots in this rare event (in this case a list of nearest suitable and reachable airports can be provided beforehand). It is also possible to detect different conditions of malfunctioned engine(s) (e.g. N1 stuck; engine separation; etc.) and modify deceleration characteristic accordingly (e.g. N1 stuck compared to windmill produces more drag; when engine has separated, drag is reduced).

It is further required to have a flight model, which describes deceleration characteristics of the aircraft. Source of information about flight model can be database, charts, equations, etc. In order to provide distance required to decelerate from initial speed to final speed, flight model needs to be provided with information: aircraft configuration (flaps, landing gear, speedbrakes, . . . ), initial speed, final speed, what vertical path is flown (e.g. level flight, descend on path with fixed angle), current or predicted aircraft weight, and current and predicted wind velocity. If description of aircraft deceleration with idle thrust in level flight is available, the algorithm can use this to calculate deceleration for various descend angles as well as to calculate angle of descend for flight at constant speed. However, it is also possible to use another source of information (database, charts, equations etc.) where previously mentioned items are supplemented with value of descend angle, in that case in order to determine angle of descent to maintain speed with idle thrust, flight model will require following information: aircraft configuration (flaps, landing gear, speedbrakes, etc.), descend speed, current or predicted aircraft weight, and current and predicted wind velocity.

Wind information may also be desirable, in some embodiments. Wind information is desirable as an input for the algorithm as wind can significantly affect aircraft deceleration and is frequent reason of an unstabilized approach. On the other hand strong headwind which was not considered during approach will negatively affect fuel consumption and noise levels. There can be various sources of this information and based on this a predicted wind situation for the trajectory can be created. Combining two or more sources can provide best results. Sources of wind information can be: onboard systems (FMS or inertial navigation system), broadcast from the ground stations (processed automatically or read from FMS after manual input of data by the crew), broadcast from other aircraft in the vicinity, especially from those ahead of the particular one and using similar or same trajectory.

Further, with regard to the stabilization gates, it is appreciated that majority of operators use two stabilization gates: 1000 feet AAL and 500 feet AAL stating that 1000 feet gate is mandatory for go around in case of flight in IMC and 500 feet gate is mandatory for go around regardless of weather conditions. In order to reflect this in the algorithm, scenario can be evaluated more than once for different final gate. There is also one special situation (circling approach) where stabilization gate at 300 feet AAL is used. These values are derived from current practice, but they can be easily modified for future, also number of gates during approach can be changed. In one embodiment, the algorithm can use a concept which both increases safety and reduces number of scenarios being evaluated during every algorithm run. It suggests that all scenarios are being evaluated for 1000 feet gate and only in case that no scenario is found as usable, another evaluation of scenarios for 500 feet gate is initiated.

In order to take economy into account every scenario can be also accompanied by value describing amount of fuel which needs to be saved when flying this particular scenario in order to move it higher in ranking. It is also possible for every scenario to calculate total distance during which throttles are not in idle position and give scenarios with small value of this distance a priority. In order to introduce other factors for decisions (e.g., when a scenario uses not very standard procedures), it is possible to assign every scenario a value of amount of fuel which needs to be saved and then transfer this amount into distance, and then subtract this distance from total distance flown on idle thrust. It is also possible to use sophisticated methods to calculate for every scenario amount of fuel which is going to be used and use that as one parameter for deciding the best scenario.

Time to landing is another example of factor which can be added into the selection process. Selection of scenario can be also interconnected with previous step where every scenario is individually evaluated for usability and if some scenario in the list is detected as desired, evaluation of other scenarios can be stopped earlier to save computation resources of the hardware. Scenarios can be divided into ranked groups where any scenario from higher group is always preferred over scenario from lower group. For example first group contains scenarios using standard procedures, second contains scenarios with nonstandard corrective actions like level deceleration. In that case if during evaluation of scenarios there is at least one scenario from the first group acknowledged as usable, scenarios from the second group are all skipped. Selection of best scenario is then commenced only with scenarios from the first group.

Selection of scenario can be also dynamic, that is, based on variable parameters, e.g., when the delay for landing is higher than predefined time value, scenarios which require shorter time of flight are automatically preferred (and its weight can be based on cost index value from the FMS for instance). Also, the pilot can be allowed to interfere with the selection of scenario (e.g. by means of modifying weight of one or more parameters being used during selection, by manual selection of preferred scenario from the list which is provided to him via HMI, etc.).

A hysteresis mechanism is also desirable in connection with the presently described algorithm. In order to implement hysteresis into the algorithm, it is required to store information about scenario suggested in previous run of algorithm along with timestamp when it was suggested for the first time. If this scenario is being suggested for shorter time than predefined value (e.g. 10 seconds) and if this scenario is found among usable scenarios during current algorithm run, this scenario can be suggested right away and further searching for the best scenario can be skipped. There can be also decisive section implemented which determines ratio between fuel efficiency and safety of previous scenario and the best scenario in current list and together considering timestamp value (time from last change of scenario depicted to pilot) it can decide when it is feasible to change scenario. This can help to optimize number of new instructions which pilot is required to process, it can sometimes lead to very short hysteresis (sudden change of scenario for sake of safety or economy) or sometimes it can leave the best scenario (but not so much better than others) unused.

In some instances, it will be desirable for the algorithm to issue advice to "go-around. " Normally decision for go around is being done by crew in final gate altitude (1000 feet, 500 feet or even 300 feet AAL) so not very high above the ground (and quite deep below go around altitude). Proposed algorithm can determine situation where there is no scenario for which aircraft can become stabilized by final gate much higher. This happens when list of usable scenarios (list of scenarios which passed evaluation as usable) does not contain any items. Behavior of go around advice in situation where user prefers to use more than one stabilization gate (e.g. 1000 feet AAL for IMC and 500 feet AAL regardless of weather conditions) depends on whether there is a means to determine weather conditions at the particular final gate or not. In case that weather information are not available, go around advice is provided as a conditional statement (e.g. for 1000 feet gate: "if IMC: GO AROUND; if VMC: set flaps 40"). This logic can be handled within algorithm in case that weather information is provided. It also depends on how reliable weather data are and where is the margin for algorithm to accept responsibility for decision in such conditional case. For instance when visibility higher than 10 kilometers and no clouds have been recently reported from particular airport during daytime, algorithm can evaluate this as VMC, but when cumulus clouds at altitude of stabilization gate has been reported, only pilot can determine whether he/she has visual contact with the ground or not.

Further, apart from the elements of stabilization such as flaps, landing gear or speed, there are additional parameters which when not satisfied can give crew a reason for go around (such as vertical, horizontal or heading deviations, abnormal pitch or bank angle etc.). These parameters can be monitored during the approach and crew can be informed about excessive values, or this monitoring can be skipped (assuming that crew is aware of them) and their evaluation can be initiated shortly before final gate in order to assess all relevant information for potential go around advice. If a deviation is detected (e.g. sudden increase of speed due to wind gust, deviation from the vertical flight path), algorithm can also determine whether there is enough time and space to correct this deviation until certain point (e.g. lower final gate) and if not, crew can be advised for a go around.

Additionally, the present algorithm can monitor additional parameters or conditions which are closely connected with stabilization of the aircraft safety of approach and landing. If necessary, algorithm can issue warnings for the crew (e.g. "Max tailwind component", "Speedbrakes<->Throttles", "Excessive vertical speed", etc.).

Additional considerations can be incorporated into the algorithm for instances wherein the aircraft passes the final gate. When aircraft passes final stabilization gate, it can be either turned off or it can provide continual monitoring of parameters which influence stabilized approach and also landing. In case that some deviation from these parameters is detected, crew can receive warning. Algorithm can also determine whether there is enough time to correct this deviation until certain point (e.g. runway threshold) and if not, crew can be advised for a go around.

At predetermined altitude or distance (based on aircraft type) algorithm can also calculate (based on current flight parameters) how a flare maneuver is going to look like and predict touchdown point position and aircraft speed at touchdown. In case that these predicted values are out of predefined margins, an alert or advice for go around can be issued to the crew. Algorithm can be also extended for calculation of required distance for rollout and in case that required distance exceeds available distance, crew can be warned about this and go around suggested even when still in the air.

In accordance with the present disclosure, therefore, it will be appreciated that the algorithm is able to determine when it is the best time to change aircraft configuration. Therefore it is possible to connect algorithm with units responsible for changing aircraft configuration and operate them automatically without requirement of human input. For instance the algorithm can inform the crew about coming automatic configuration change (e.g. setting flaps to the next step, extend landing gear, retract speedbrakes, etc.) and commence the announced action in case that crew did not reject this instruction.

In other embodiments, the algorithm may optionally be extended by the inclusion of some form of context monitor that gathers information from various channels about crew status and overall situation (e.g. crew workload, crew stress levels, crew fatigue, aircraft malfunctions, ATC requests etc.) and evaluates it. Based on its output the algorithm can utilize adaptive behavior. Examples include, but are not limited to: adjustments in selection of scenario process (e.g. it can suggest scenario which is standard and require minimum actions for moments when high workload is detected); modified modalities when communicating with the crew (e.g. for high workload an instruction is accompanied with aural elements); and automatic actions performed in the cockpit (e.g. automatic gear extension when it is evaluated as safe and if the crew has high workload due to other factors), for example.

It will be appreciated that in all examples disclosed above, the approach algorithm requires access to the flight parameters, noted above, as gathered by the aircraft's on-board computerized sensing systems. Additionally, the algorithm must be tuned for each aircraft, using data available in the aircraft reference manual.

Standalone GUI Concepts

The foregoing has provided a description of various algorithms used to generate energy management information. Based on this generated information, the present disclosure provides various display embodiments that allow the flight crew to more easily understand the energy management information, and thus constitute an improvement over the prior art. In the first instance, there may be provided standalone GUI concepts. These concepts may be categorized as those based on distance scale, those based on speed scale, and those based on required drag (of course, combinations of two or more thereof may be realized).

Standalone Concepts Based on Distance Scale

As initially noted above, the algorithm provides DTG values from the runway threshold for current aircraft position and the positions of configuration changes. Based on this information, in FIG. 1, graphical elements present the real flight situation as a reference to understand the GUI. Current aircraft position is at the tip of the aircraft symbol. The relative distances between current aircraft position and positions of configuration changes are depicted on the vertical profile line. The optimum position of the aircraft is also provided. It is the position where aircraft should be, given the current situation (speed, altitude, weight, weather, etc.) in order to assure stabilized approach as well as the best economy. The optimum position can be either behind or ahead of the aircraft position.

The real flight situation is then transformed to GUI (graphical elements inside the rectangles). GUI can be arranged either vertically or horizontally, as shown in FIG. 1. The GUI depicts current aircraft position always on the fixed place and shows fixed distance ahead of the aircraft and behind it. Graphical elements are numbered and described as follows in FIG. 1:
  a) Static elements:
    1. GUI border
    2. Current aircraft position—arrow head connected with a reference line
  b) Elements moving on horizontal/vertical axis:
    1. Positions of configuration change with text description
    2. Range for configuration change with text description
    3. Optimum position—where aircraft should be with the current speed
    4. Position of the last configuration change which can assure stabilized approach, with text description c) Other: Position trend—where aircraft position is going to be in a predefined time period (e.g., 30 sec.)

Configuration changes can be depicted by elements 3 or 4 or by a combination of both (like in FIG. 1). The amount of depicted configuration changes (3 or 4) can be reduced —only the closest one below and above the aircraft position (element 2) are shown and the rest are hidden. This way the GUI is less cluttered. For better understanding of the GUI rational and behavior, all configuration changes are depicted in FIGS. 1 and 2. As used in the Figures, the following definitions apply: F: next flap position (i.e., 1° to 2°, and so forth); S: extend speed brake; SF: speed brake and next flap position; SG: extend landing gear and extend speed break; GF: extend landing gear and next flap position; SGF: extend speed break, extend landing gear, and next flap position. Further, in order to fly in an economic way, element 5 should be in close proximity of element 2—this means that aircraft position is (nearly) optimal in the current situation.

Figure 2A:
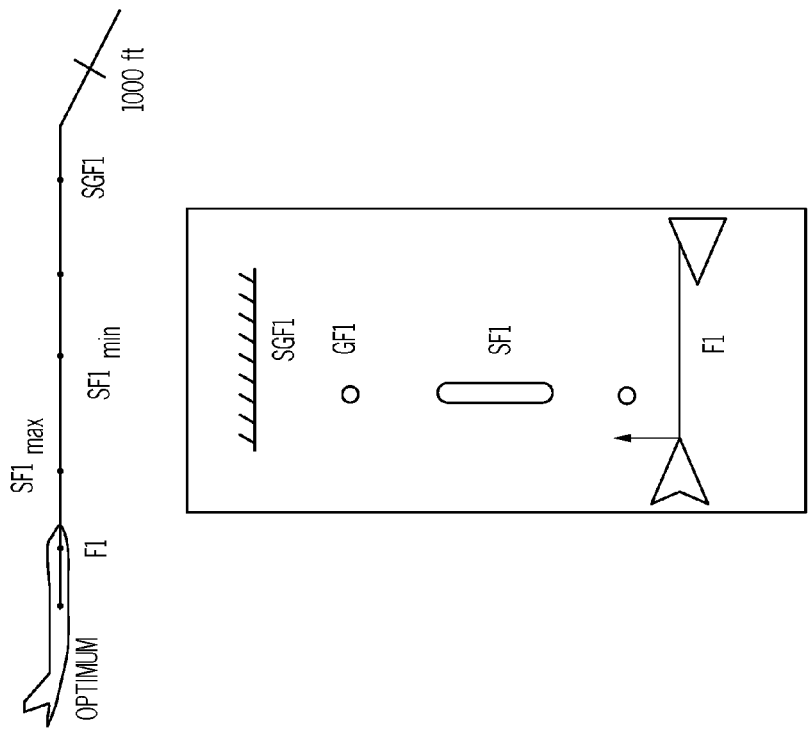
Figure 2B:
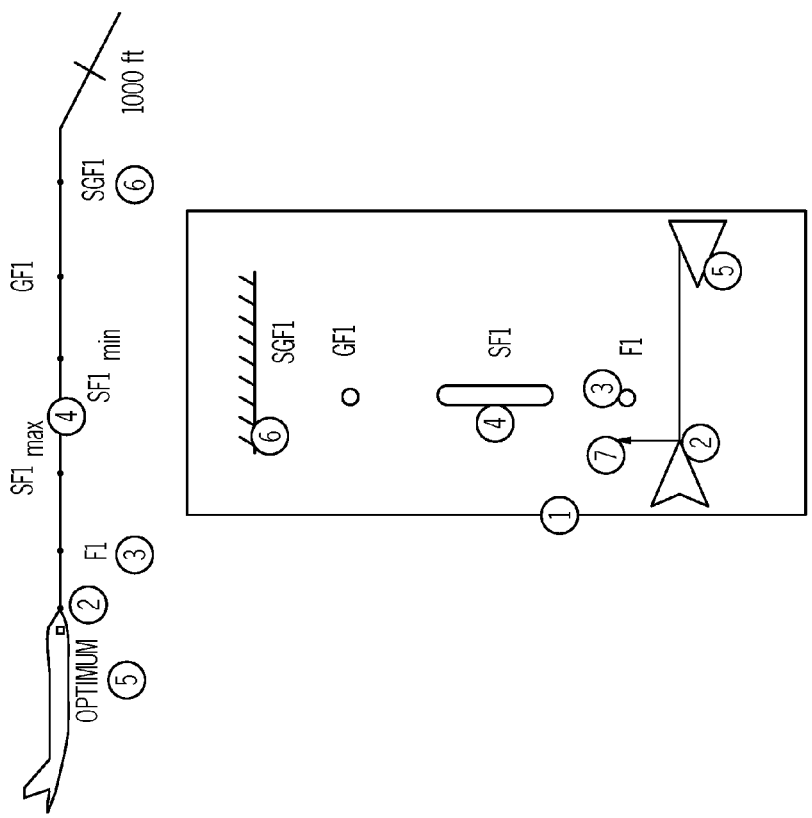
Figure 2C:
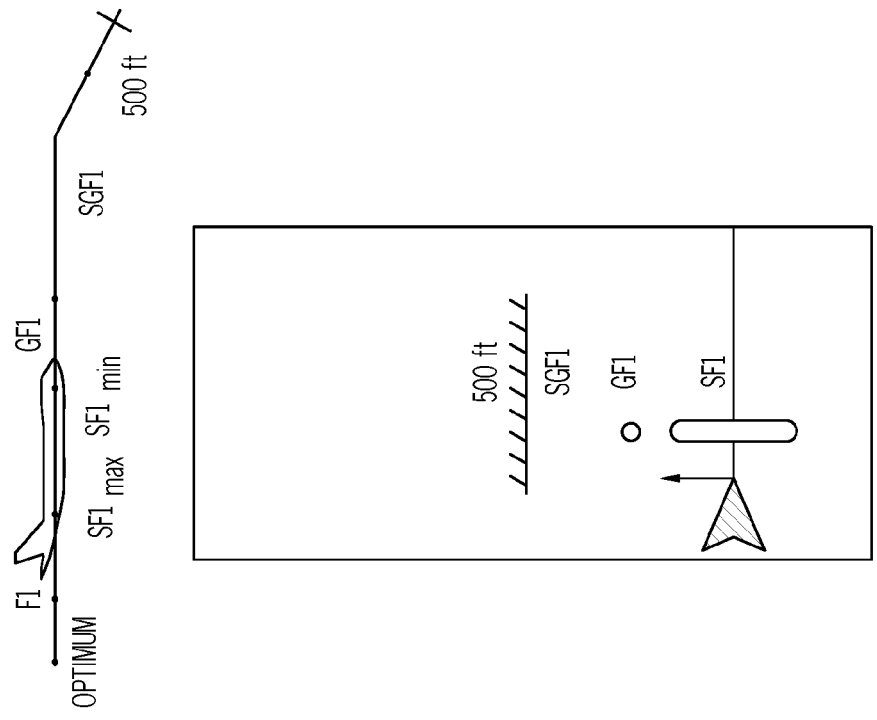

As an aircraft flies forward from situation depicted on FIG. 2A, the elements 3, 4 and 6 move down towards the element 2 (aircraft position). When an element of configuration change (3 or 4) reaches element 2, it tells pilots that it is the best time to change aircraft configuration to this particular one. If an element of configuration change (3 or 4) gets below element 2, this particular configuration change is considered as insufficient for maintaining a stabilized approach—aircraft would not pass final stabilization gate in stabilized condition with this configuration. Elements 3 or 4 which go below element 2 can have reduced saliency as shown in FIGS. 2B and 2C. The distance between element 2 and 6 indicates how far the current situation is from being unstabilized. The closer the distance, the closer it is to being unstabilized.

Figure 2D:
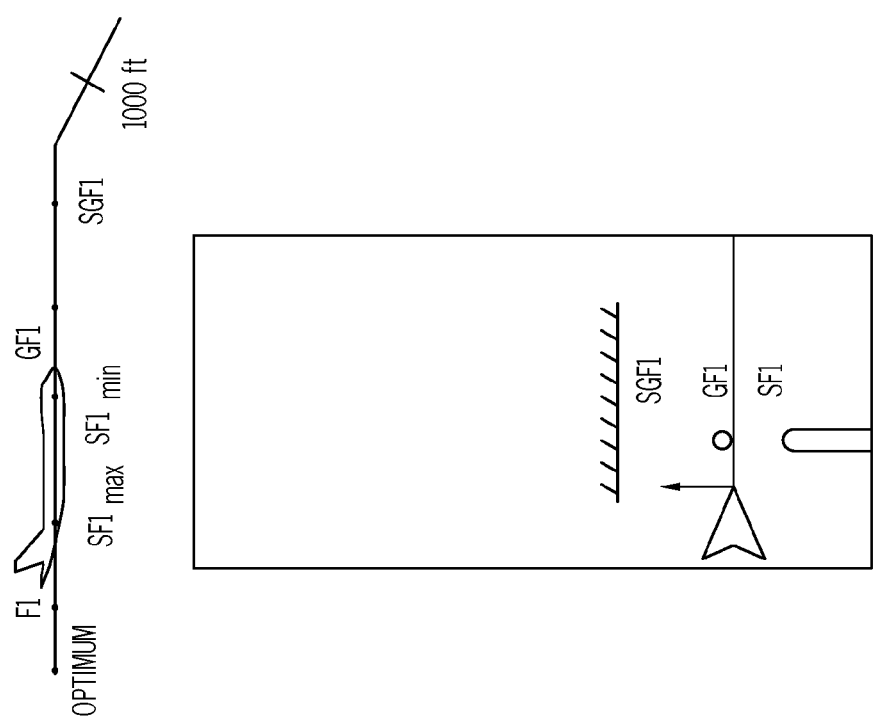

The previously-described alogrithm provides the GUI with information about the final stabilization gate that is used for calculations-either 500 ft. gate or 1000 ft. gate. This can be communicated to pilots via the change of appearance of the most important two elements—element 2 and 6. As shown in FIG. 2D, when 500 ft. gate is used, element 2 changes from fully-filled to strip-filled and text "500 ft." is added on top of element 6.

Figure 2E:
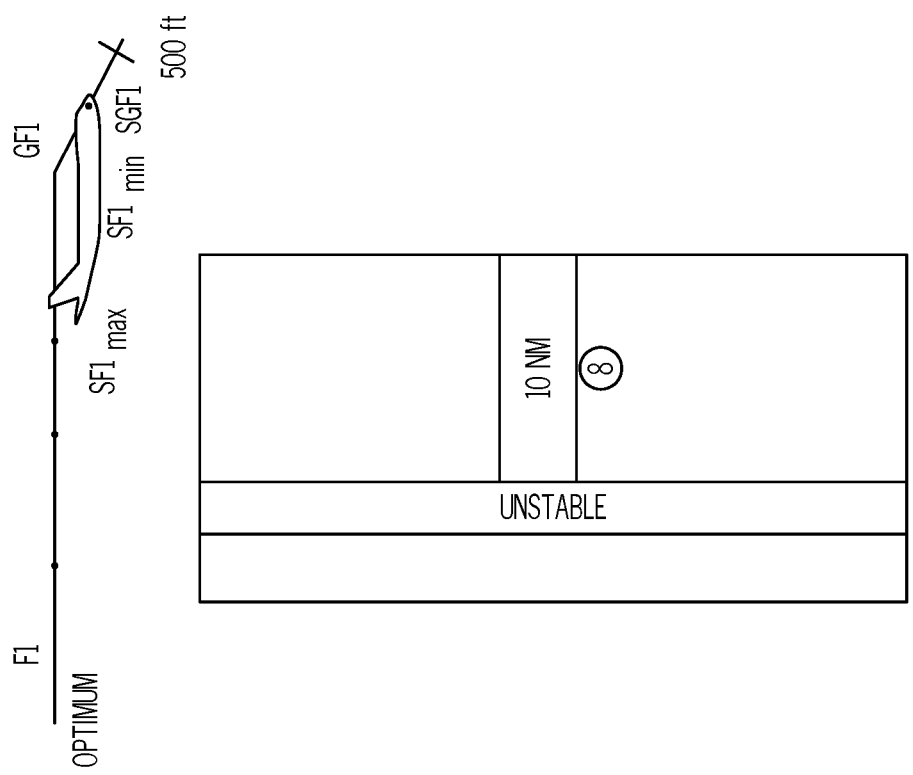

When element 6 reaches the element 2 and the lower stabilization gate is already in use, there is no scenario in which aircraft can be stabilized when passing the lower stabilization gate. FIG. 2E shows the situation—all graphical elements are replaced by message announcing that approach is considered unstable. Graphical element 8 on FIG. 2E informs pilot about number of additional miles required to re-stabilize the approach.

Although FIGS. 2A-2E have been initially presented above, the following description of the flight phases a-e (FIGS. 2A-2E) may aide in a better understanding thereof:
  a) Aircraft flies at constant speed, it is slightly ahead of the optimum point (meaning that its speed or altitude is slightly higher than predicted optimum). The nearest instruction F1 is slowly approaching arrow 2 from above. Pilot can decide for flaps 1 anytime, even at this moment (GUI would then depict next configuration change—e.g. flaps 2). But pilot does not act and misses the flaps 1 point.
  b) Pilot missed flaps 1 point and in a short time aircraft will reach point where speedbrakes and flaps 1 should be used to ensure sufficient deceleration and thus later passing final gate in stabilized condition. Pilot sees the range in which the combination of speedbrakes and flaps 1 is the best solution for the situation.

c) Pilot misses speedbrakes +flaps 1 range and pilot sees that it is time to go for landing gear and flaps 1 combination—again to ensure sufficient deceleration. Pilot does not act and element 6 reaches the arrow 2 (not depicted)—meaning that no scenario can ensure stabilization of aircraft at or before the 1000 ft. gate.

d) Since no scenario for 1000 ft. ensures stabilization, in order to provide the pilot with information in case that 500 ft. gate is allowed to be used (e.g., VMC prevail):
  1) algorithm switches to calculation for the 500 ft. gate
  2) main elements are filled with stripes.

Pilot also sees that in order to get stabilized by 500 ft. gate it would be sufficient to select speedbrakes and flaps 1. Pilot does not act.

e) Since pilot did not act, he/she missed all possibilities to get stabilized by 1000 ft. and consequently by 500 ft. gate. When element 6 for 500 ft. touches the arrow 2, there are no available scenarios, only message UNSTABLE is depicted along with the information about required additional distance to go of 10 NM for the crew to negotiate with ATC.

Standalone Concepts Based on Speed Scale

Figure 3:
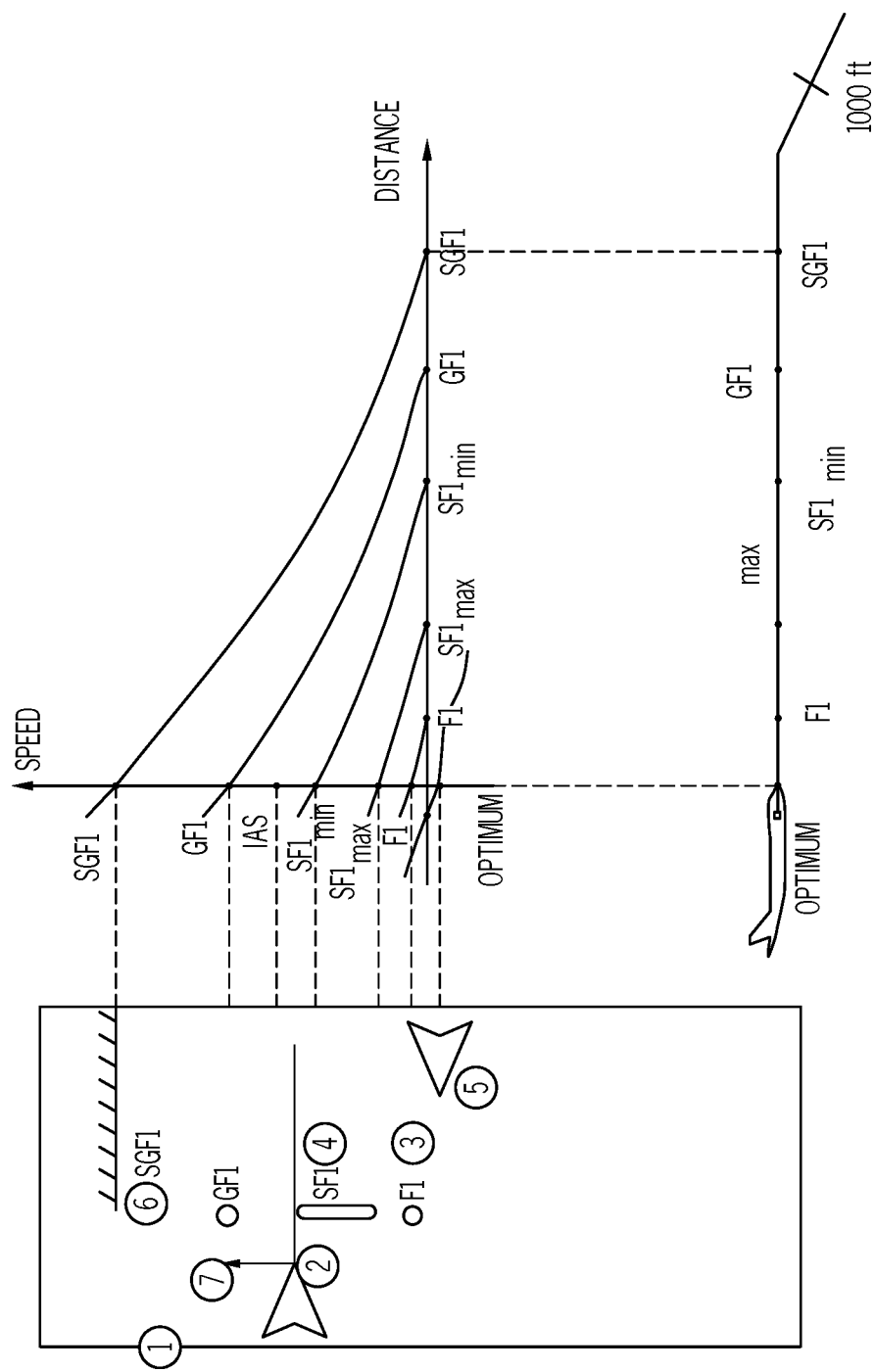

In FIG. 3, graphical elements present the real flight situation. Current aircraft position is at the tip of the aircraft symbol. The relative distances between current aircraft position and positions of configuration changes are depicted on the vertical profile line. The optimum position where aircraft should be is also indicated.

All distance-based information is plotted on the horizontal "distance" axis and then transformed to speed on the vertical axis. The curves describe deceleration characteristics of each configuration change setting. For example, the red curve for "SGF1" describes how aircraft would decelerate if speed brake was in use, landing gear was down and flap 1 was set. The point of intersection of a curve with the speed axis indicates the maximum speed aircraft can have at this moment in order to maintain stabilized approach with this particular configuration change. In the example of FIG. 3, the current speed (IAS) is higher than the intersection points of F1, SF1 max and SF1 min, which means that F1 and SF1 are insufficient to maintain stabilized approach. In this case, pilot should go for GF1 or SGF1. The optimum speed is calculated with the current position and the normative configuration at this moment.

The speed-based GUI in the rectangle is derived from intersection points of all configuration changes, current speed and optimum speed. Graphical elements are explained as follows.

Static elements:
1. GUI border
2. Current speed—arrow head connected with a reference line Elements moving on the vertical axis:
3. Position of configuration change with text description
4. Range for configuration change with text description
5. Optimum speed the aircraft should have at this moment
6. The maximum speed the aircraft can have at this moment to assure stabilized approach, with text description Other:
7. Speed trend—aircraft speed in a predefined period of time (e.g. 30 seconds)

Configuration changes can be depicted by elements 3 or 4 or by a combination of both (like in FIG. 3). The amount of depicted configuration changes (3 or 4) can be reduced —only the closest one below and above the current speed (element 2) are shown and the rest are hidden. This way the GUI is less cluttered. For better understanding of the GUI rational and behavior, all configuration changes are depicted in FIG. 3. In order to fly in an economic way, element 5 should be in close proximity of element 2—this means that current speed is (nearly) optimal in the current situation.

As the approach proceeds, elements of configuration changes (such as element 3, 4 and 6) move along the vertical axis. When an element of configuration change reaches element 2 (current speed), it tells pilots that it is the best time to perform this particular configuration change. If an element of configuration change gets below element 2, this particular configuration change is no longer sufficient for maintaining a stabilized approach. Elements that go below element 2 can have reduced saliency.

Figure 4:
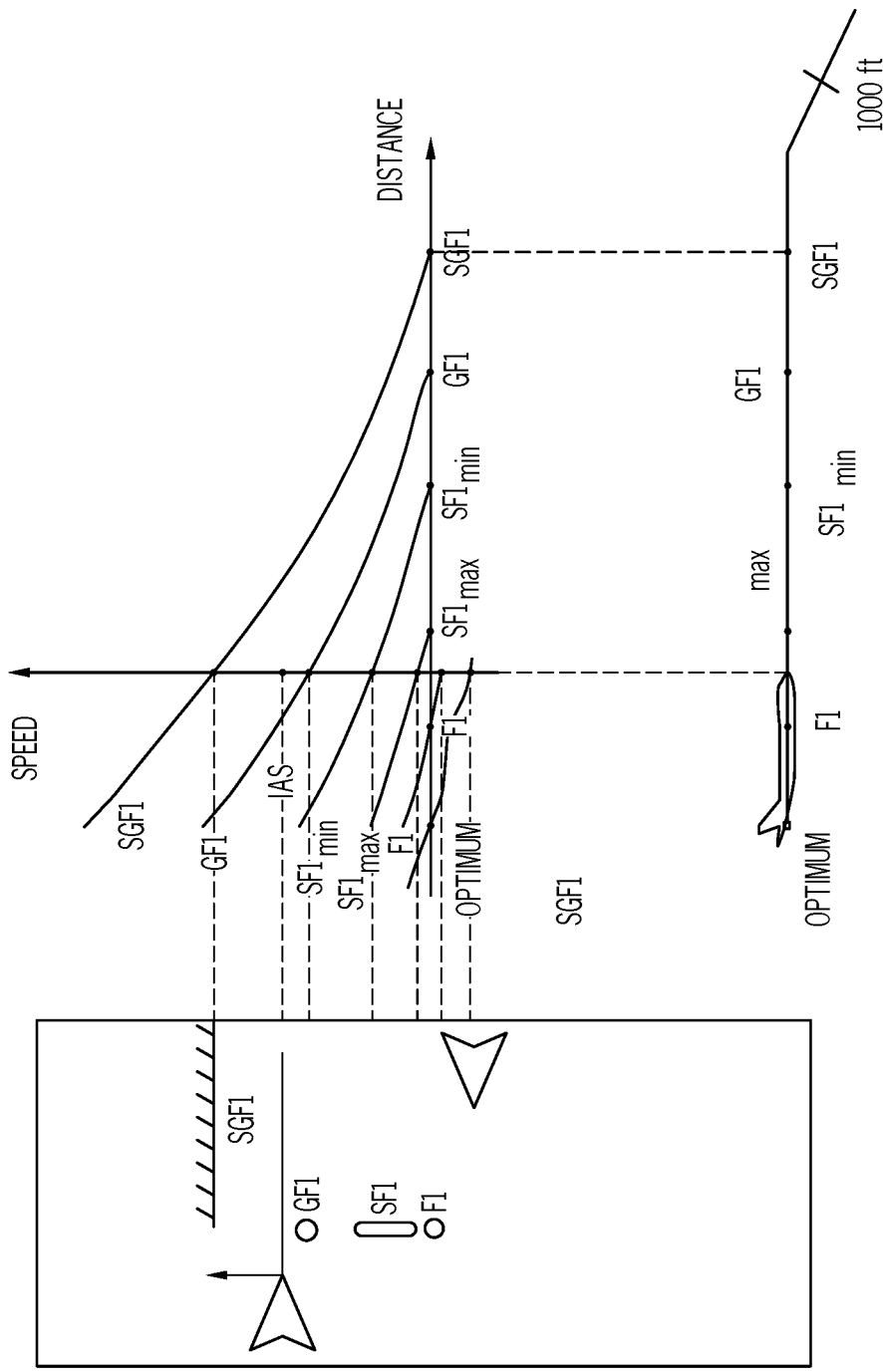

From the situation shown in FIG. 3, if pilot does not use drag device and the aircraft flies forward with constant speed, the situation would evolve to the one shown in FIG. 4. The current speed goes close to the maximum speed with a trend of getting even closer. Most configuration changes are insufficient to assure stabilized approach. Pilots need to use speed brake, landing gear and flap all together to provide enough drag to stabilize. Also, similar to the distance-based GUI concept, if the final gate in use is 500 ft., a text notification can be added on top of the element 6, such as FIG. 2, D. When the approach is unstabilized, all graphical elements are removed, only message USTABILIZED is depicted, such as FIG. 2, E.

Standalone Concepts Based on Required Drag

Figure 5:
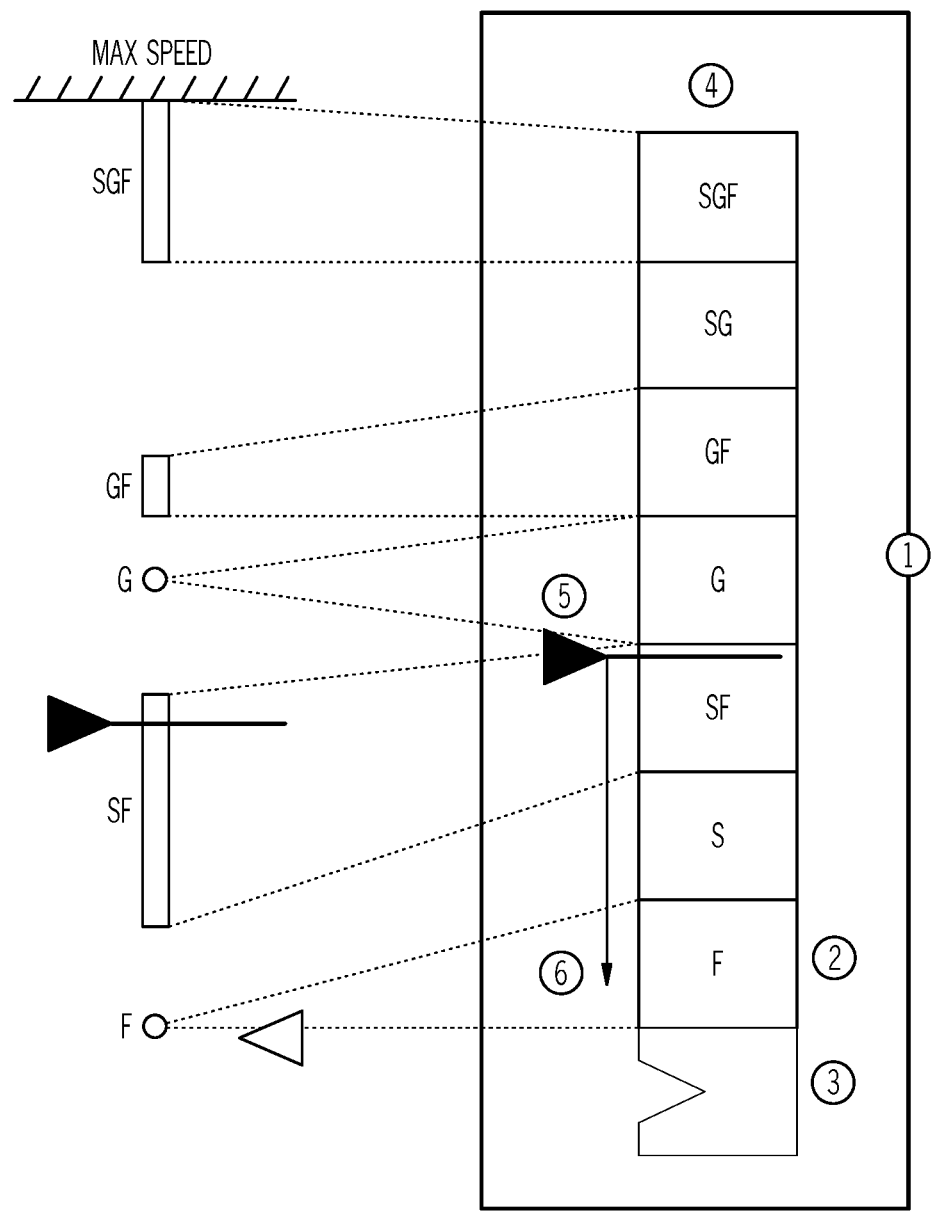

The GUI based on required drag conveys the amount of drag needed at a moment to maintain stabilized approach. Drag is described by configuration changes because different configuration changes generate different amount of drag. FIG. 5 shows an example of drag-based GUI. Graphical elements are described as follows:

a) Static elements:
  1. GUI border
  2. Drag sections—each configuration change has its own section. Sections are ordered by the amount of drag each configuration change generates—the higher the drag is, the higher the section locates. In this example, sections have the same and fixed length.
  3. Section for "no action required" —configuration changes are not yet necessary
  4. The top of the drag bar—indicating the border of being unstabilized (it is mapped from the maximum speed at this moment to maintain stabilized approach).

b) Dynamic elements:
  5. Arrow with a reference line—moving up and down the bar, indicating what is the smallest drag at this moment to maintain stabilized approach.
  6. Arrow towards optimum—the arrow is pointing downwards/upwards when the optimum speed is below/above the current speed; the length of the arrow is calculated with respect to the difference between current and maximum speeds:

$$Length_{arrow} = \frac{Speed_{current} - Speed_{optimum}}{Speed_{maximum} - Speed_{current}} \times Length_{bar\ top\ to\ element\ 5}$$

The drag-based GUI can be derived from speed-based GUI. As shown in FIG. 5, speed ranges for applicable configuration changes are rescaled to fit into the fixed length of drag sections. As the arrow of current speed moves inside a speed range, element 5 moves along the corresponding drag section. Due to rescaling, element 5 can move at different speeds inside different drag sections. In the example of FIG. 5, configuration change SF and above can provide sufficient drag to maintain stabilized approach. However, SF is the best course of action at this moment considering fuel consumption.

Figure 6A:
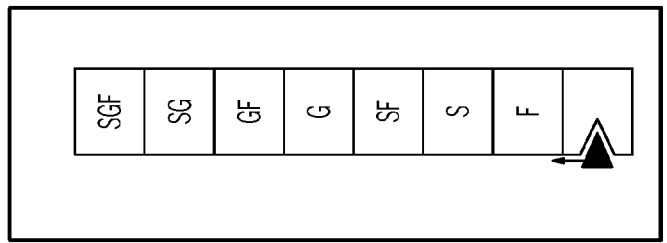
Figure 6A:
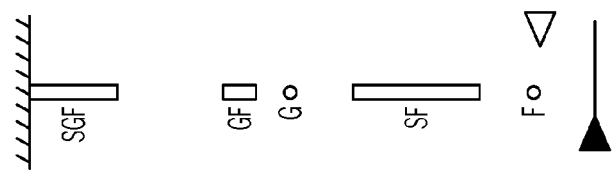
Figure 6B:
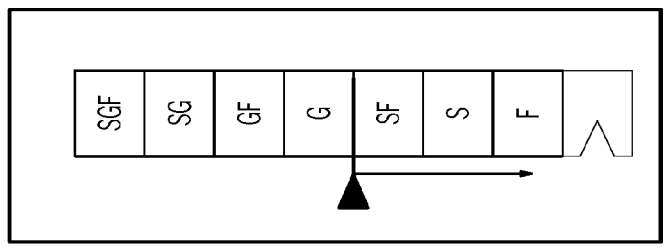
Figure 6B:
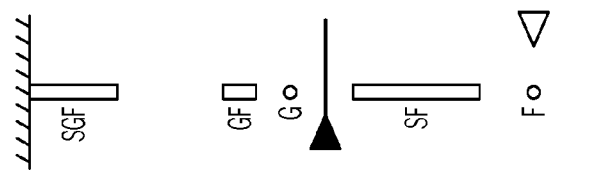
Figure 6C:
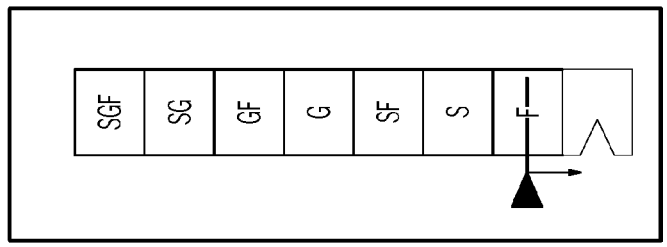
Figure 6C:
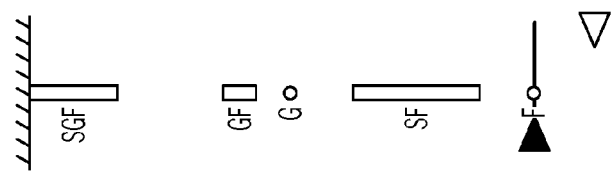

If a configuration change does not have a speed range, but a single applicable speed value, element 5 will stay in the center of the drag section (shown in FIG. 6A). If the current speed is between the ranges of 2 configuration changes, element 5 stay at the border between these 2 drag sections (shown in FIG. 6B). If the current speed is below the speed range for F, no drag device is needed, element 5 is fixed ("parked") at element 3 (shown in FIG. 6C). It does not reflect the change of current speed; however, the trend arrow is still depicted to show the relative difference between current speed and optimum speed.

When the length and order of all drag sections are fixed, the position of the arrow along the bar (without the text inside each section) already conveys which configuration change is being pointed to. When pilots get familiar with this GUI, the effort on reading the text within each section can be reduced.

Figure 7:
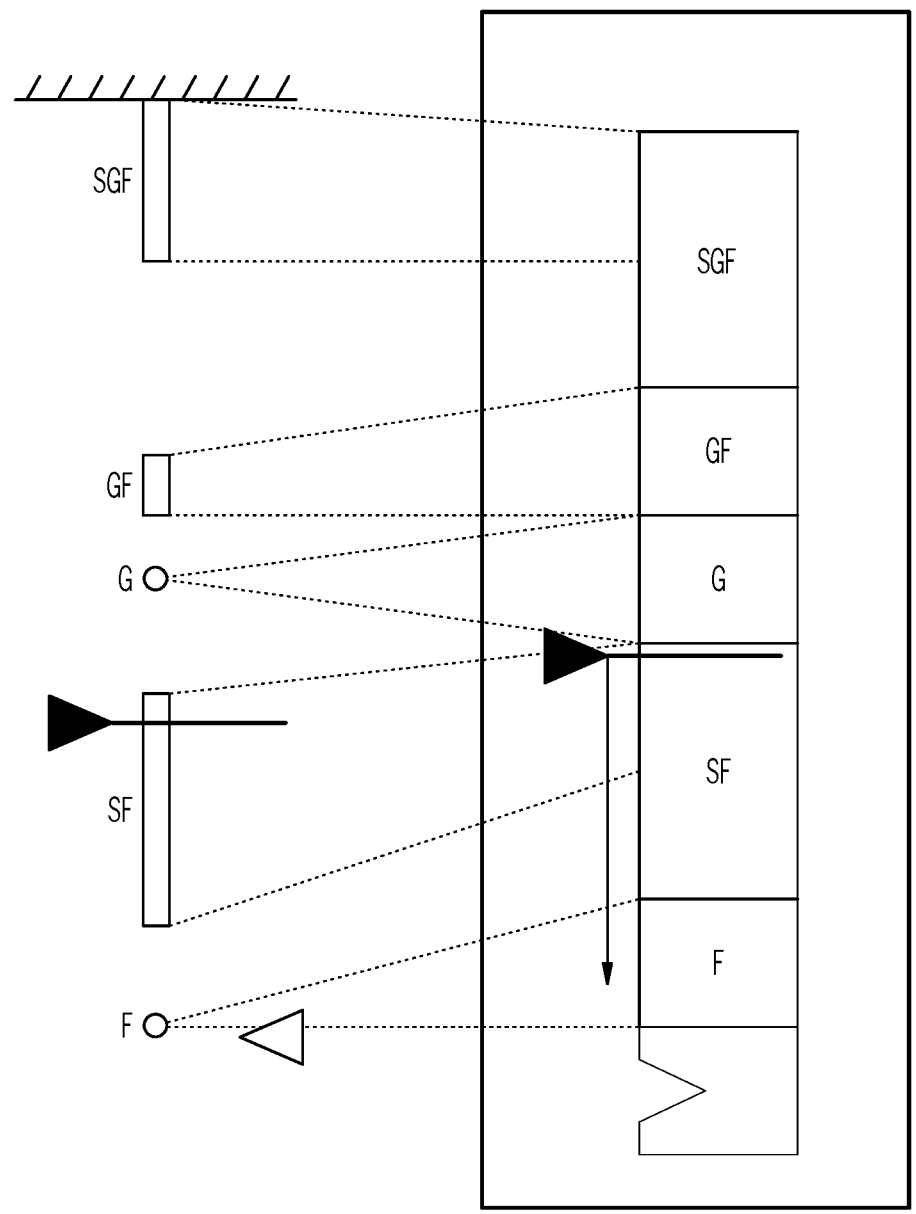

Alternatively, the length of the sections can be changing based on the actual range of speed/distance for all configuration changes, such as the example in FIG. 7. If a configuration change has minimum applicable range (e.g. "G" and "F" in FIG. 7), its section has a fixed minimum length. If a configuration change is not applicable at the moment, it does not need to be depicted (e.g. "S" and "SG" in FIG. 7).

Figure 8:
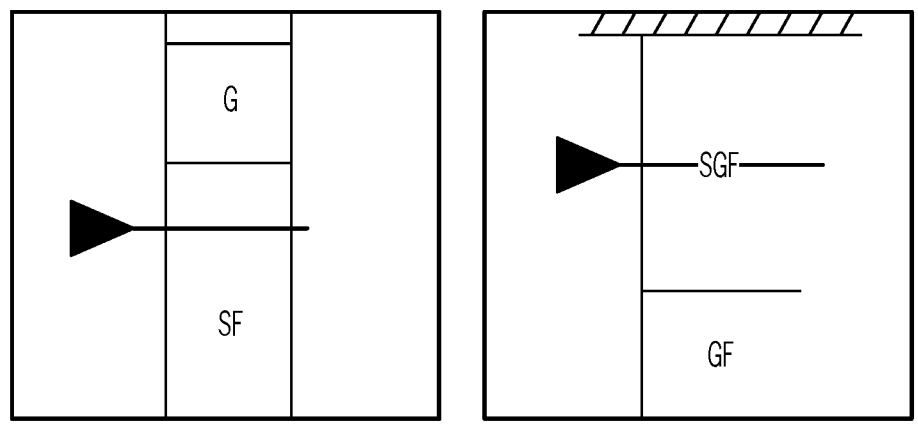

Additionally, a fixed-length sliding window can be centered around element 5, so that only the bar area within the window is depicted to pilots. As FIG. 8 shows, the window moves with element 5 up and down along the bar, keeping element 5 in the center. If the window goes beyond the upper border of the bar, additional graphical indication (e.g. slash lines) can be used to show that the situation is close to being unstabilized.

Range Overlap

One common challenge of all three GUI types (speed, distance and drag-based) is to deal with range overlaps of different configuration changes. While overlaps can be depicted as how they are, a wiser solution can be to reduce overlap by defining priority rules. Table 1 shows an example of such priority rules. In general, configuration changes with less drag have higher priority than those with more drag. However, there can be multiple configuration changes on one priority level.

TABLE 1

| Priority 1 | Priority 2 | Priority 3 | Priority 4 |
|---|---|---|---|
| F | SF | FG | SG |
| S | | G | SGF |

Figure 9:
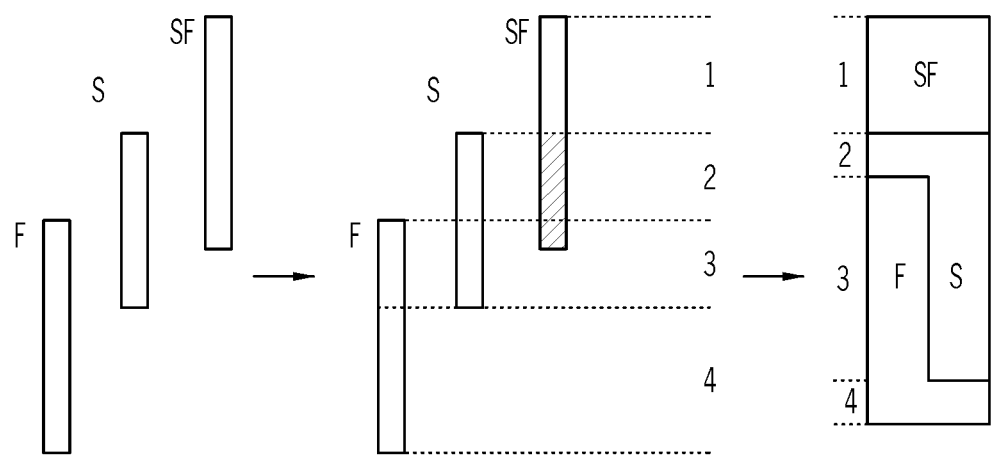

In the areas of overlap, only the one with the highest priority will be depicted. If ranges with the same priority overlap, they will both be depicted. In the example shown in FIG. 9, ranges for F, S and SF all overlap. Based on Table 3, the bottom of the SF range is moved up ("cut") to the top of the S range; while the overlap of S and F is depicted on GUI.

Figure 10A:
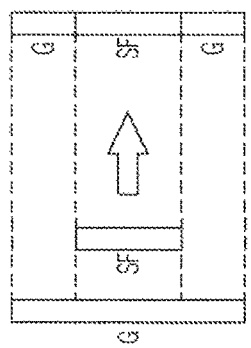
Figure 10B:
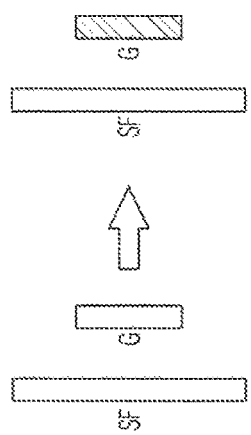
Figure 10C:
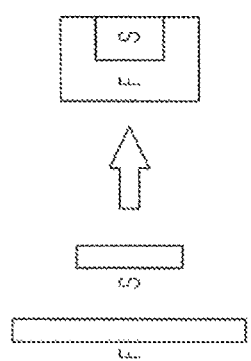
Figure 11A:
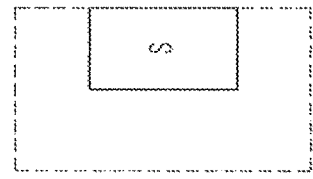
Figure 11B:
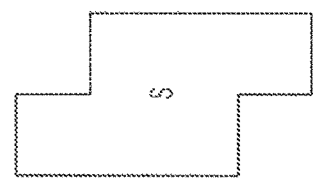
Figure 11C:
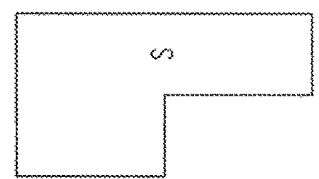
Figure 11D:
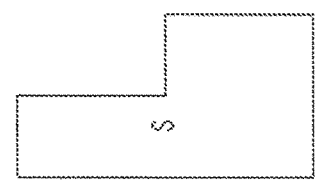
Figure 11E:
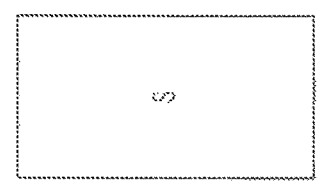

If one range completely overlaps with another range on the same priority level, the overlap is depicted, for example as shown in FIG. 10A. If one range completely overlaps with another range on a higher priority level, this range is ignored (see FIG. 10B). If one range completely overlaps with another range on a lower priority level, it replaces the other range in the section of overlap (see FIG. 10C).

For all types of GUI, a configuration change can be depicted in different shapes in order to reflect overlaps with other configuration changes. For example, FIGS. 11A-11E shows different shapes of a section for different overlap situations a-e, respectively:
  a) No overlap;
  b) Partially overlap with another range;
  c) Partially overlap with another range;
  d) Partially overlap with two other ranges;
  e) Completely overlap with another range on an higher priority level.

GUI Embedded Into Existing Cockpit Displays

The information items of the GUI can be separated and integrated into existing cockpit displays where appropriate.

Speed Tape

Figure 12:
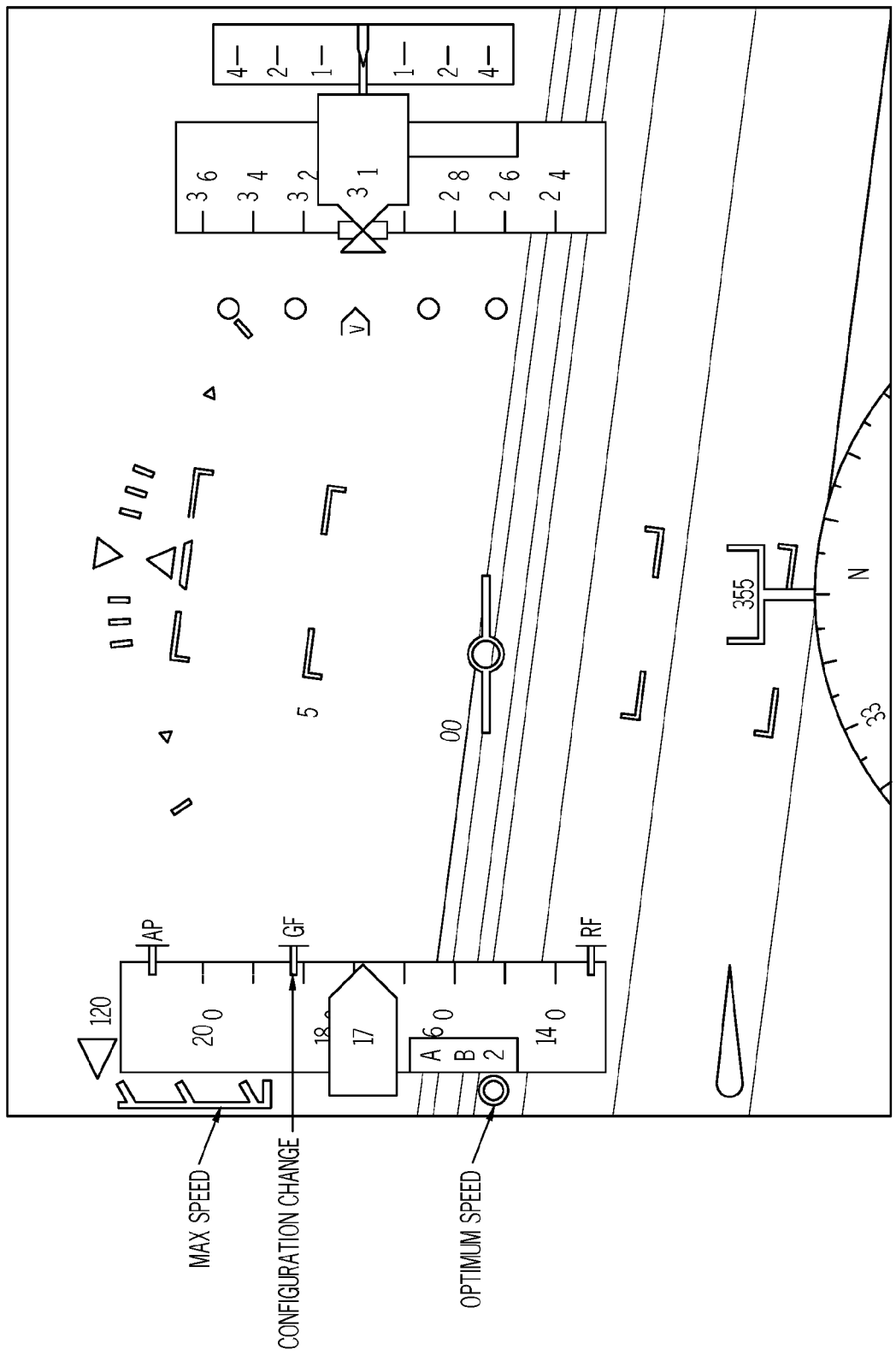

All graphical elements on the standalone speed-based GUI can be integrated onto speed tape. An example is shown in FIG. 12, where maximum speed, optimum speed and next configuration change are depicted on the speed tape.

Navigation Display

Figure 13:
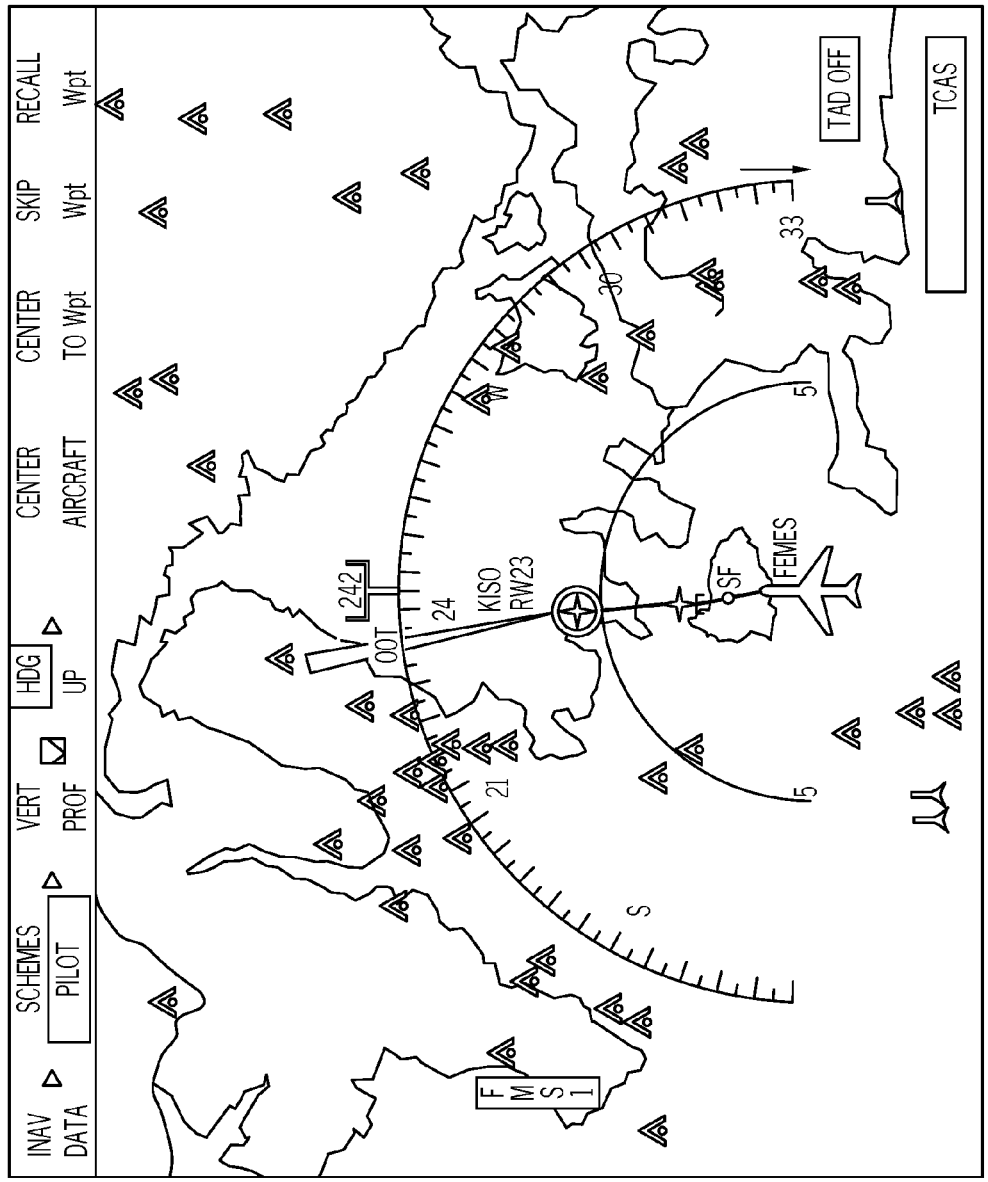

In one embodiment, all graphical elements on the standalone distance-based GUI can be depicted along the flight path line on the navigation display. To avoid over cluttering, it may be necessary to depict only elements of higher importance. For example, in the FIG. 13, only the position of the next configuration change and the position of the final gate are depicted on the flight path. The final gate symbol can change color to indicate whether it is possible to stabilize or not.

Figure 14:
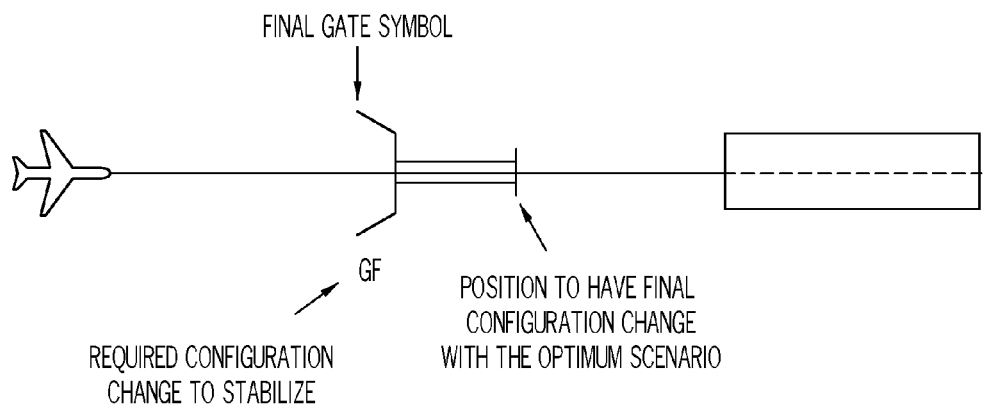

In another embodiment, FIG. 14 shows another concept for depicting the GUI information on the navigation display. The final gate (1000ft or 500ft) is depicted on the flight path. In addition, a short bar symbol indicates the position where the aircraft will have the final configuration change with the optimum scenario. If this bar symbol locates ahead of the final gate symbol, pilot can follow the standard procedure to reach final configuration before the final gate; or he/she can postpone using flaps to reach final configuration as close to the gate as possible (better economy). If the bar symbol locates behind the final gate symbol, the standard procedure is not able to stabilize at the final gate, thus more drag is needed. In this case, advisory for configuration change is depicted below the final gate symbol. In the example in FIG. 14, pilot needs to use landing gear and flaps to stabilize at the final gate.

Figure 15:
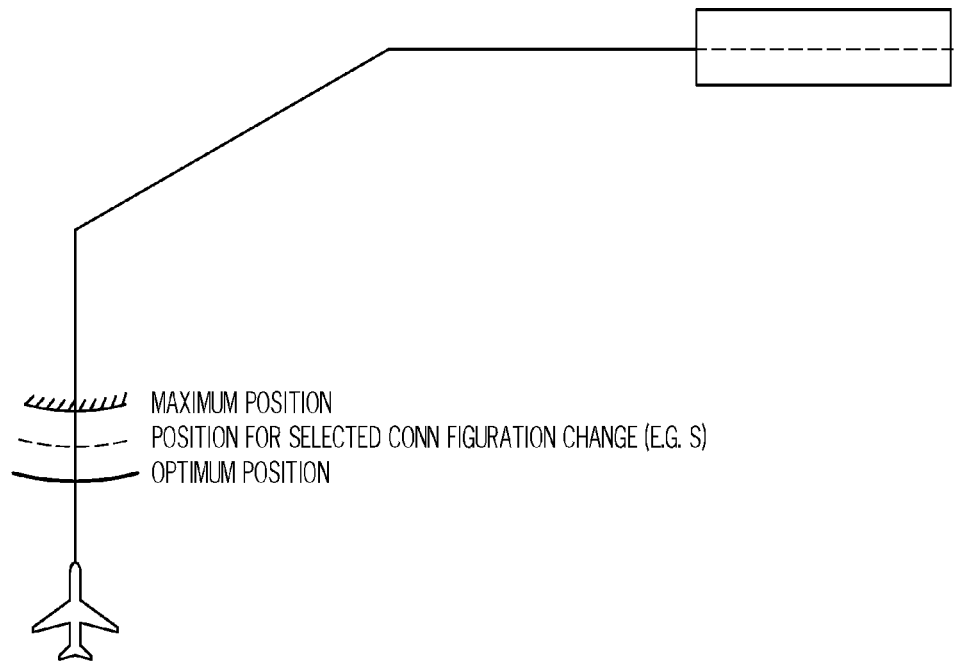
Figure 16:
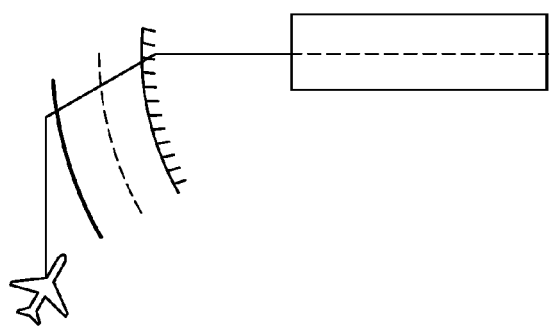

In yet another embodiment, in the concept illustrated in FIG. 15, 3 arc symbols are added on the flight path to indicate respectively: the optimum position the aircraft should be at this moment, position to apply a predefined configuration change (e.g. S), and the maximum position aircraft can be at this moment to maintain stabilized approach. The length of the 3 arcs symbols can change based on cross track error or heading error. When aircraft is very well on the flight path programmed in FMS, the arcs can be relatively short. If certain cross track error or heading error occurs, the arcs can be extended to cover the relevant area ahead of the aircraft (FIG. 16). The shape of arcs also does not need to be regular. It can vary to reflect different wind situations in different areas ahead of the aircraft.

Vertical Situation Display

Figure 17:
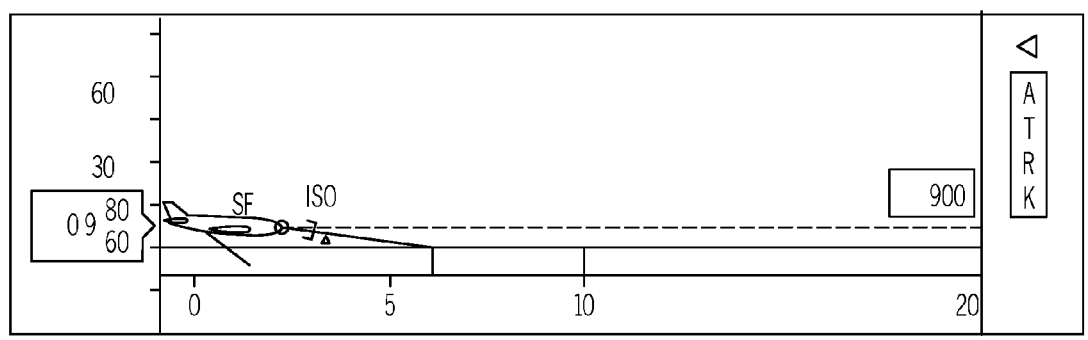

All graphical elements on the standalone distance-based GUI can be depicted along the vertical profile on the vertical situation display. To avoid over cluttering, it may be necessary to depict only elements of higher importance. For example, in the FIG. 17, only the position of the next configuration change and the position of the final gate are depicted on the vertical profile. The final gate symbol can change color to indicate whether it is possible to stabilize or not.

Flight Path Marker

Figure 18:
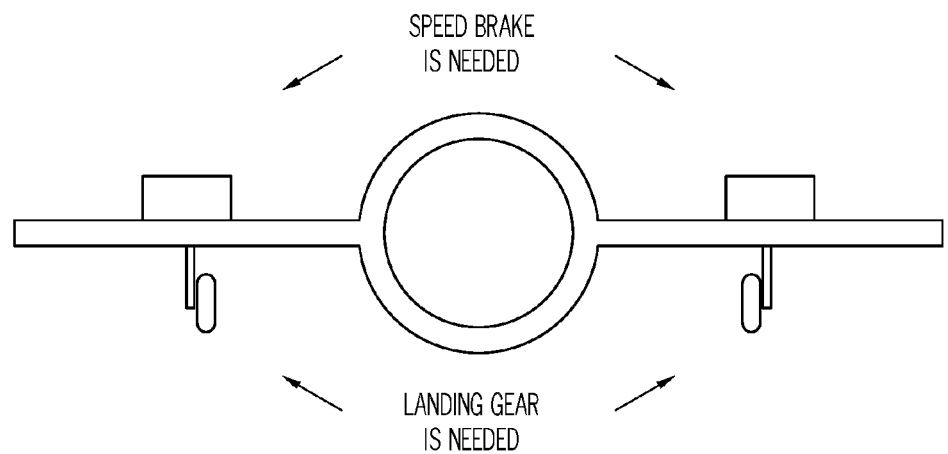
Figure 19:
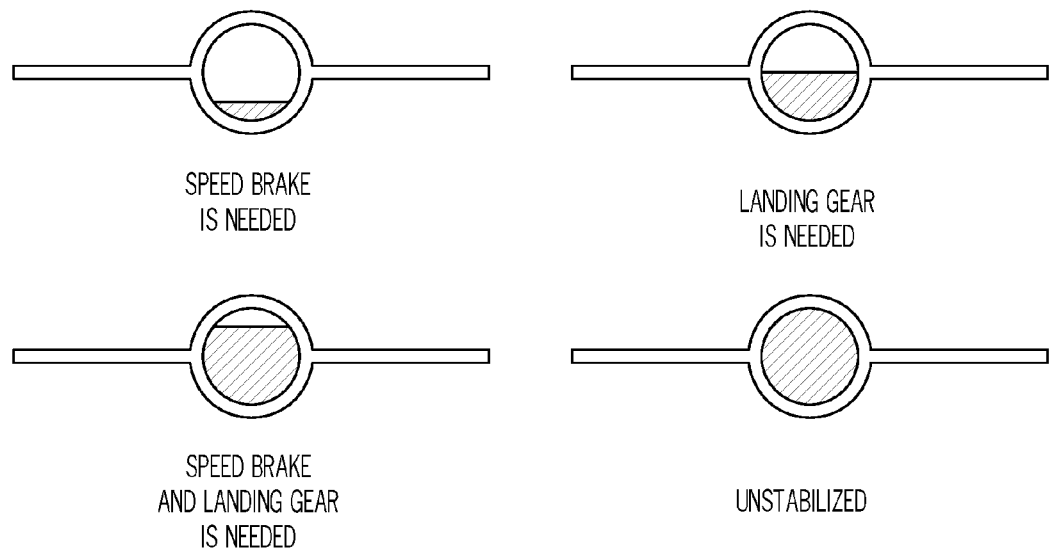

Flight path marker is often in the center of pilot's attention during approach, which makes it a useful place to depict the GUI information. For example, speed brake and gear symbols can be added to the flight path marker to indicate that pilots need to use speed brake and gear to maintain stabilized approach (see FIG. 18 for an example). Another type of information that can be integrated on the flight path marker is how far the current situation is from being unstabilized, or in other words, how much more drag is needed to keep the approach stable. FIG. 19 shows an example. The center circle may filled by any semi-transparent color to indicate how much drag is needed to maintain stabilized. The larger the filled area is, the more drag is needed. The same depiction method can be also applied on the wing symbols. For example, add a thin bar on top of each wing symbol and fill them up according to required drag.

Flap Indicator

Figure 20:
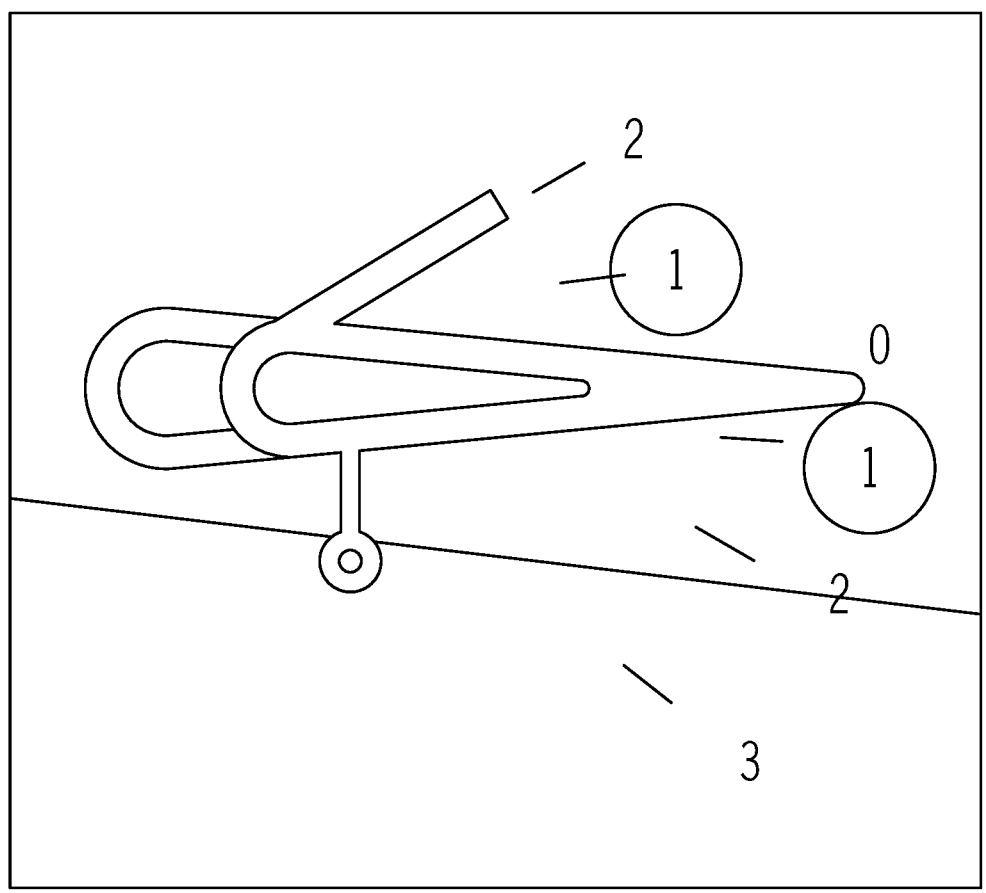

The flap indicator indicates the current flap position. Additional cues can be added to indicate the required flap position, gear and speed brake. In FIG. 20, current flap position is at 0. The required position (flaps1) is depicted by adding a circle around number "1". Same goes for speed brake. The current position is at 2. A circle around "a" indicates that it is necessary to retract speed brake. An additional gear symbol can be added below the flap symbol to indicate it is necessary to put down landing gear.

Additional Vertical Situation Display Embodiments

Figure 21A:
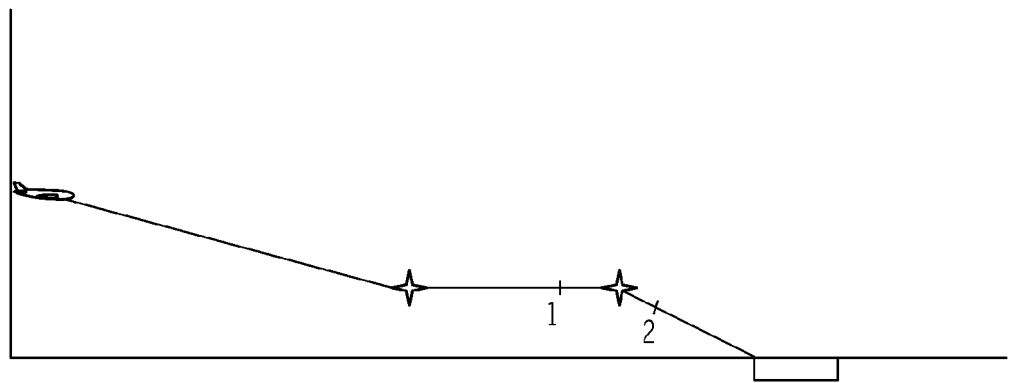

The GUI shown in FIG. 21A may be embedded into the vertical situation display. It utilizes expected vertical trajectory ahead of the aircraft as provided by the FMS. In the first step the GUI utilizes also algorithm outputs. The algorithm can provide information about the last point from which the aircraft is able to achieve stabilization at certain configuration.

As an example, points can be defined as following:

point 1 is a point determined by the algorithm showing the last position from which aircraft can reach final stabilization gate in stabilized condition (assuming following the predefined vertical trajectory) if aircraft reaches this point at current configuration (current setting of flaps and speedbrakes and landing gear)

point 2 is a point determined by the algorithm showing the last position from which aircraft can reach final stabilization gate in stabilized condition (assuming following the predefined vertical trajectory) if aircraft used all available devices to induce maximum drag available at given situation (e.g. if speed and configuration allows and speedbrakes are not deployed yet, this maximum drag configuration assumes adding extension of speedbrakes to current configuration; the same can be applied for landing gear and flaps).

Figure 21B:
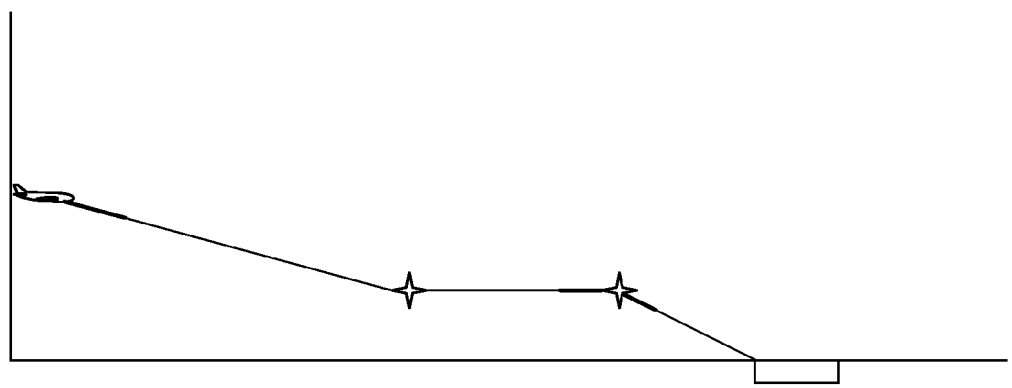

If the aircraft is following FMS vertical trajectory—meaning that aircraft is on the FMS vertical profile, such two calculated points 1 and 2 along with the known FMS vertical profile in between them are sufficient for construction of GUI cue as shown in FIG. 21B.

Figure 21C:

Such cue defines for pilots a zone (in this example grey zone) with following meaning. When the aircraft approaches the beginning of the grey zone (point 1), the pilot can understand that aircraft in current configuration is getting close to its limit for being stabilized at the final gate. When the aircraft enters the grey zone, it is understood that aircraft needs to increase its drag and decelerate in order to be stabilized. When the aircraft approaches point 2—the ending of the grey zone, it is understood that it will soon reach a point from which it would not be possible to reach final stabilization gate in stabilized condition, even by using the maximum available drag. When the grey zone is behind the aircraft (on the left side from aircraft symbol), this zone is no longer visible on the VSD. Therefore some other graphical element (symbol or text) needs to be used to inform the crew about lost possibility to finish the approach stabilized. An example of such symbol (grey ellipse), as shown in FIG. 21C.

Figure 21D:
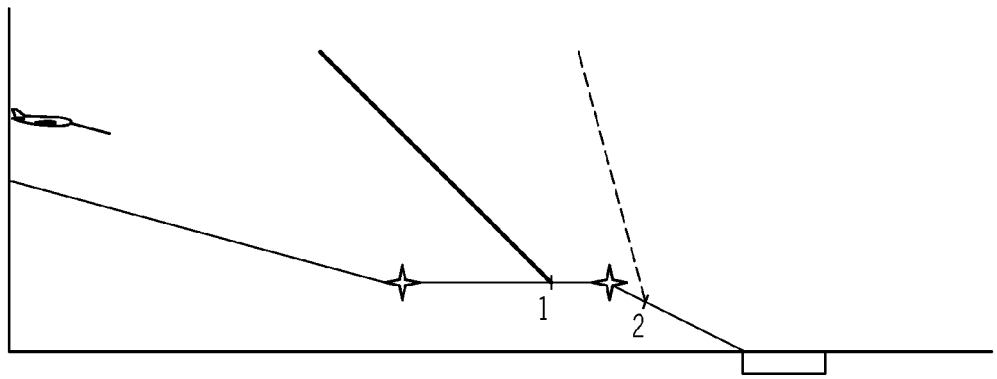

If the aircraft is not following FMS trajectory (meaning that aircraft is not vertically aligned with the trajectory), points 1 and 2 are used as ends of lines which define a grey region. Lines are defined by point and angle. The angles of lines are defined (and determined by the algorithm) as maximum angle of descend which aircraft can achieve with engines on idle without accelerating the aircraft in aircraft configuration defined by the line's point of origin (using the example for points definition from above—for point 1 its current aircraft configuration, for point 2 aircraft would use all available devices to induce maximum drag available at given situation). The top end of lines is determined by aircraft vertical position on the display-lines end slightly above aircraft vertical position. The position of points and lines as shown in FIG. 21D.

Figure 21E:
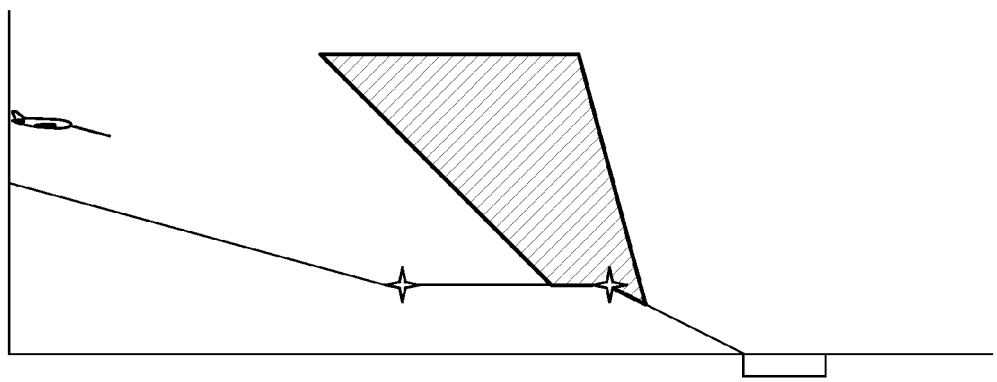

The final GUI would use area (gray in this example) defined by constructed lines and the FMS vertical trajectory, as shown in FIG. 21E.

The displayed area in this example (given by definition of points 1 and 2) shows pilots how much further ahead (for various altitudes) aircraft can fly until a configuration change is required in order to decelerate sufficiently and reach final gate in stabilized state.

Figure 21F:

If the aircraft enters the area (FIG. 21F), such configuration change is required. Angles of vertical boundaries of the area also give pilot idea about how steep descend is achievable without increasing aircraft kinetic energy (without accelerating).

Figure 21G:

When the aircraft leaves the area, the grey zone can be very small or even out of the display, in such case a dedicated symbol or text can be used to inform crew that aircraft has passed the grey area (in this example due to definition of point 2 it would also mean that there is not enough drag on the aircraft to reach final gate stabilized). FIG. 21G demonstrates using same exemplary symbol as above for such situation.

Display Systems

Figure 22:
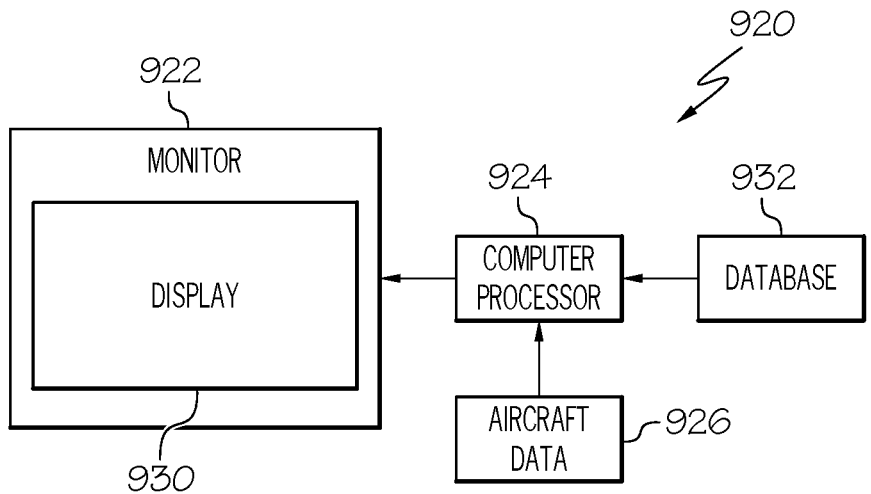
FIG. 22 is a functional block diagram of a generalized flight display system suitable for use with an embodiment of the present disclosure.

As previously discussed, it is envisioned that embodiments of the present disclosure are designed to operate on or in conjunction with a computer-implemented display system for providing notifications and advisories to the flight crew. FIG. 22 is a functional block diagram of a generalized flight display system 920. Flight display system 920 includes at least one monitor 922, a computer processor 924, and a plurality of data sources 926 including data from sensors onboard the aircraft. Sensor data 926 can pertain to any sensed condition on the aircraft or outside of the aircraft, including but not limited to engine data, avionics data, altitude data, flight controls data, positional data, fuel data, weather data, and any other types of aircraft data for which a condition can be sensed Monitor 922 may include any suitable image-generating device including various analog devices (e.g., cathode ray tube) and digital devices (e.g., liquid crystal, active matrix, plasma, etc.). Computer processor 924 may include, or be associated with, any suitable number of individual microprocessors, memories, power supplies, storage devices, interface cards, and other standard components known in the art. In this respect, the computer processor 924 may include or cooperate with any number of software programs or instructions designed to carry out the various methods, process tasks, calculations, and control/display functions described above.

During operation of flight display system 920, computer processor 924 drives monitor 922 to produce a visual display 930 thereon. In one group of embodiments, display system 920 may be deployed on the flight deck of an aircraft. In such embodiments, monitor 922 may assume the form a Multi-Function Display (MFD) included within a Crew Alert System (CAS), such as an Engine Instrument and Crew Advisory System (EICAS). Similarly, processor 924 may assume the form of, for example, a Flight Management Computer of the type commonly deployed within a Flight Management System (FMS). Sensed aircraft data sources 926 may, in addition to the data discussed above, include one or more of the following systems: a runway awareness and advisory system, an instrument landing system, a flight director system, a weather data system, a terrain avoidance and caution system, a traffic and collision avoidance system, a terrain database, an inertial reference system, and a navigational database.

A database 932 may be included for storing data relating to the above described systems and methods, for example, approach algorithm computerized instructions, approach data, and aircraft data, among other things.

Figure 23:
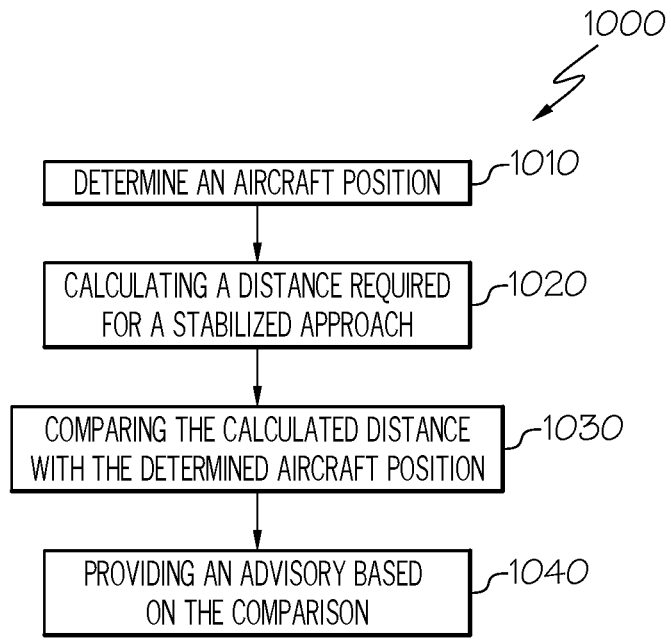
FIG. 23 is an exemplary flow diagram illustrating a method for generating a flight display in accordance with the present disclosure.

In an embodiment, as shown in FIG. 23, a flow diagram is provided illustrating a method 1000 for generating a flight display in accordance with the present disclosure. At step 1010, the aircraft position is determined. At step 1020, the approach algorithm calculates the required distance to achieve a stabilized approach. At step 1030, the calculated distance is compared to the determined position of the aircraft. Finally, at step 1040, a display is generated that provides an advisory based on the comparison, for example display system 920 described above.

As such, disclosed herein is a display system and a method for generating a display provided to help a flight crew to dissipate an aircraft's kinetic and potential energy to allow for a stabilized approach. That is, the presently described embodiments allow the aircraft to slow and descend to an approach configuration prior to reaching the "final gate," using the minimum amount of fuel possible and creating the minimum amount of noise possible. The system operates on an algorithm that monitors the current flight parameters and assists the flight crew in making adjustments to the configuration of the aircraft when the aircraft is making an approach to an airport.

While the present disclosure has provided exemplary embodiments directed to a flight display system, it will be appreciated that the embodiments presented herein can be extended to other applications where approach assistance may be desirable, and where approaches may be improved through the use of a display. For example, other suitable applications may include maritime applications, railroad applications, industrial/manufacturing plant applications, space travel applications, simulator applications, and others as will be appreciated by those having ordinary skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is being understood that various changes may be made in the function and arrangement of elements described in an exemplary embodiment without departing from the scope of the invention as set forth in the appended claims.

What is claimed is:

1. A computer-implemented flight display system for assisting a flight crew of an aircraft to arrive at a final approach gate in an energy-stabilized manner, comprising:
   a computer processor that is capable of determining a current energy situation of the aircraft;
   an electronic display device; and
   a graphical user interface (GUI) provided on the electronic display device, wherein the GUI comprises the following symbols (1) through (3):
   (1) a current aircraft position symbol indicative of a current position of the aircraft;
   (2) at least one intermediate configuration change symbol indicating a first future position of the aircraft for changing aircraft configuration to an intermediate configuration, wherein the intermediate configuration represents a configuration of greater drag as compared to a current aircraft configuration and involves the extension of one or more of: flaps, airbrakes, and landing gear; and
   (3) a final configuration change symbol indicating a second future position of the aircraft for changing aircraft configuration to a final configuration, wherein the final configuration represents a maximum drag configuration of the aircraft that is greater than the intermediate configuration and involves the extension of each of: flaps, airbrakes, and landing gear, and wherein the second future position represents the position after which, regardless of aircraft configuration, the aircraft can no longer arrive at the final approach gate in the energy-stabilized manner,
   wherein relative positioning on the GUI of the symbols (1) through (3) is based at least in part on the determined current energy situation of the aircraft such that symbols (2) and (3) are each respectively spaced apart from symbol (1) a distance in proportion to the distance of the first future position and the second future position are each respectively located in reference to the current position of the aircraft.

2. The system of claim 1, wherein the computer processor determines the current energy situation of the aircraft based on a distance to go of the aircraft to a final gate.

3. The system of claim 1, wherein the GUI is implemented as a graphical element on existing aircraft display blocks, as a standalone display on an existing aircraft display, or as a standalone display running on an electronic flight-bag of the aircraft.

4. The system of claim 1, wherein the intermediate configuration change symbol comprises a range symbol indicative of a future positional range for changing aircraft configuration.

5. The system of claim 1, wherein the GUI further comprises a position trend symbol indicative of a future position of the aircraft after a predetermined period of time.

6. The system of claim 1, wherein the GUI further comprises a second intermediate configuration change symbol indicating a third future position for changing aircraft configuration to a second intermediate configuration.

7. A computer-implemented flight display system for assisting a flight crew of an aircraft to arrive at a final approach gate in an energy-stabilized manner, comprising:
   a computer processor that is capable of determining a current energy situation of the aircraft;
   an electronic display device; and
   a graphical user interface (GUI) provided on the electronic display device, wherein the GUI comprises the following symbols (1) through (3):
   (1) a current aircraft speed symbol indicative of a current speed of the aircraft;
   (2) at least one intermediate configuration change symbol indicating a first increased aircraft speed that is greater than the current aircraft speed for changing aircraft configuration to an intermediate configuration, wherein the intermediate configuration represents a configuration of greater drag as compared to a current aircraft configuration and involves the extension of one or more of: flaps, airbrakes, and landing gear; and
   (3) a final configuration change symbol indicating a second increased aircraft speed that is greater than first increased aircraft speed for changing aircraft configuration to a final configuration, wherein the final configuration represents a maximum draft configuration of the aircraft that is greater than the intermediate configuration and involves the extension of each of: flaps, airbrakes, and landing gear, and wherein the second increased aircraft speed represents the speed beyond which, regardless of aircraft configuration, the aircraft can no longer arrive at the final approach gate in the energy-stabilized manner,
   wherein relative positioning on the GUI of the symbols (1) through (3) is based at least in part on the determined current energy situation of the aircraft such that symbols (2) and (3) are each respectively spaced apart from element (1) a distance in proportion to a difference in speed between the first increased aircraft speed and the second increased aircraft speed are each in reference to the current speed of the aircraft.

8. The system of claim 7, wherein the intermediate configuration change symbol comprises a range symbol indicative of a speed range for changing aircraft configuration.

9. The system of claim 7, wherein the GUI further comprises a speed trend symbol indicative of a future speed of the aircraft after a predetermined period of time.

10. The system of claim 7, wherein the GUI further comprises a second intermediate configuration change symbol indicating a third increased aircraft speed for changing aircraft configuration to a second intermediate configuration.

* * * * *